US008566313B1

(12) United States Patent
Zubizarreta et al.

(10) Patent No.: US 8,566,313 B1
(45) Date of Patent: *Oct. 22, 2013

(54) COMPUTER-IMPLEMENTED DOCUMENT MANAGER APPLICATION ENABLER SYSTEM AND METHOD

(75) Inventors: Miguel A. Zubizarreta, Westlake, OH (US); Alejandro Vanegas, Avon, OH (US)

(73) Assignee: Hyland Software, Inc., Westlake, OH (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/084,180

(22) Filed: Mar. 18, 2005

Related U.S. Application Data

(60) Provisional application No. 60/554,333, filed on Mar. 18, 2004.

(51) Int. Cl.
*G06F 17/30* (2006.01)

(52) U.S. Cl.
USPC .......................................... 707/736; 707/822

(58) Field of Classification Search
USPC .................................. 707/736, 822
See application file for complete search history.

(56) References Cited

U.S. PATENT DOCUMENTS

| 4,763,356 | A | | 8/1988 | Day et al. |
| 5,414,974 | A | * | 5/1995 | Van de Ven et al. ............ 53/399 |
| 5,450,538 | A | | 9/1995 | Glaser et al. |
| 5,604,896 | A | | 2/1997 | Duxbury et al. |
| 5,874,960 | A | | 2/1999 | Mairs et al. |
| 6,084,585 | A | | 7/2000 | Kraft et al. |
| 6,103,985 | A | | 8/2000 | Shell et al. |
| 6,253,244 | B1 | * | 6/2001 | Moore et al. .................. 709/231 |
| 6,427,032 | B1 | * | 7/2002 | Irons et al. ..................... 382/306 |
| 6,662,340 | B2 | * | 12/2003 | Rawat et al. .................. 715/236 |
| 6,791,571 | B1 | * | 9/2004 | Lamb ............................ 345/619 |
| 6,862,603 | B1 | * | 3/2005 | Nakajima et al. ............. 707/200 |
| 7,350,139 | B1 | * | 3/2008 | Simons ......................... 715/224 |
| 2001/0034734 | A1 | * | 10/2001 | Whitley et al. ............ 707/104.1 |
| 2002/0165882 | A1 | * | 11/2002 | Zettel et al. ................... 707/530 |
| 2002/0191212 | A1 | * | 12/2002 | Simpson et al. ............. 358/1.15 |
| 2003/0097377 | A1 | * | 5/2003 | Yahara et al. ................. 707/200 |
| 2003/0120657 | A1 | * | 6/2003 | French et al. ................... 707/10 |
| 2004/0199491 | A1 | * | 10/2004 | Bhatt ............................... 707/2 |
| 2005/0018213 | A1 | * | 1/2005 | Marti ............................ 358/1.1 |

OTHER PUBLICATIONS

U.S. Appl. No. 10/303,430, filed Nov. 25, 2002, Non-Final Office Action dated Mar. 23, 2006.
U.S. Appl. No. 10/303,430, filed Nov. 25, 2002, Response to Non-Final Office Action dated Mar. 23, 2006.
U.S. Appl. No. 10/303,430, filed Nov. 25, 2002, Non-Final Office Action dated Dec. 24, 2008.

(Continued)

*Primary Examiner* — Son T Hoang
(74) *Attorney, Agent, or Firm* — Jones Day

(57) ABSTRACT

Systems and methods for retrieving documents stored in a document management system based upon data from an application. While an interface is displayed, associations are created between one or more fields on the application's interface and one or more retrieval-related attributes of the document management system. Data that is subsequently provided for the fields is used to retrieve documents from the document management system based the created associations. The data obtained is used for such other operations as generating bar codes and generating indexes for documents to be stored in a document management system.

19 Claims, 45 Drawing Sheets

(56) References Cited

OTHER PUBLICATIONS

U.S. Appl. No. 10/303,430, filed Nov. 25, 2002, Response to Non-Final Office Action dated Dec. 24, 2008.
U.S. Appl. No. 10/303,430, filed Nov. 25, 2002, Final Office Action dated Oct. 14, 2009.
U.S. Appl. No. 10/303,430, filed Nov. 25, 2002, Response to Final Office Action dated Oct. 14, 2009.
U.S. Appl. No. 10/303,430, filed Nov. 25, 2002, Non-Final Office Action dated May 27, 2010.
U.S. Appl. No. 10/303,430, filed Nov. 25, 2002, Response to Non-Final Office Action dated May 27, 2010.
U.S. Appl. No. 10/303,430, filed Nov. 25, 2002, Final Office Action dated Dec. 8, 2010.
U.S. Appl. No. 10/303,430, filed Nov. 25, 2002, Response to Final Office Action dated Dec. 8, 2010.
U.S. Appl. No. 10/303,430, filed Nov. 25, 2002, Non-Final Office Action dated May 23, 2011.
U.S. Appl. No. 10/303,430, filed Nov. 25, 2002, Response to Non-Final Office Action dated May 23, 2011.

\* cited by examiner

FIG. 22

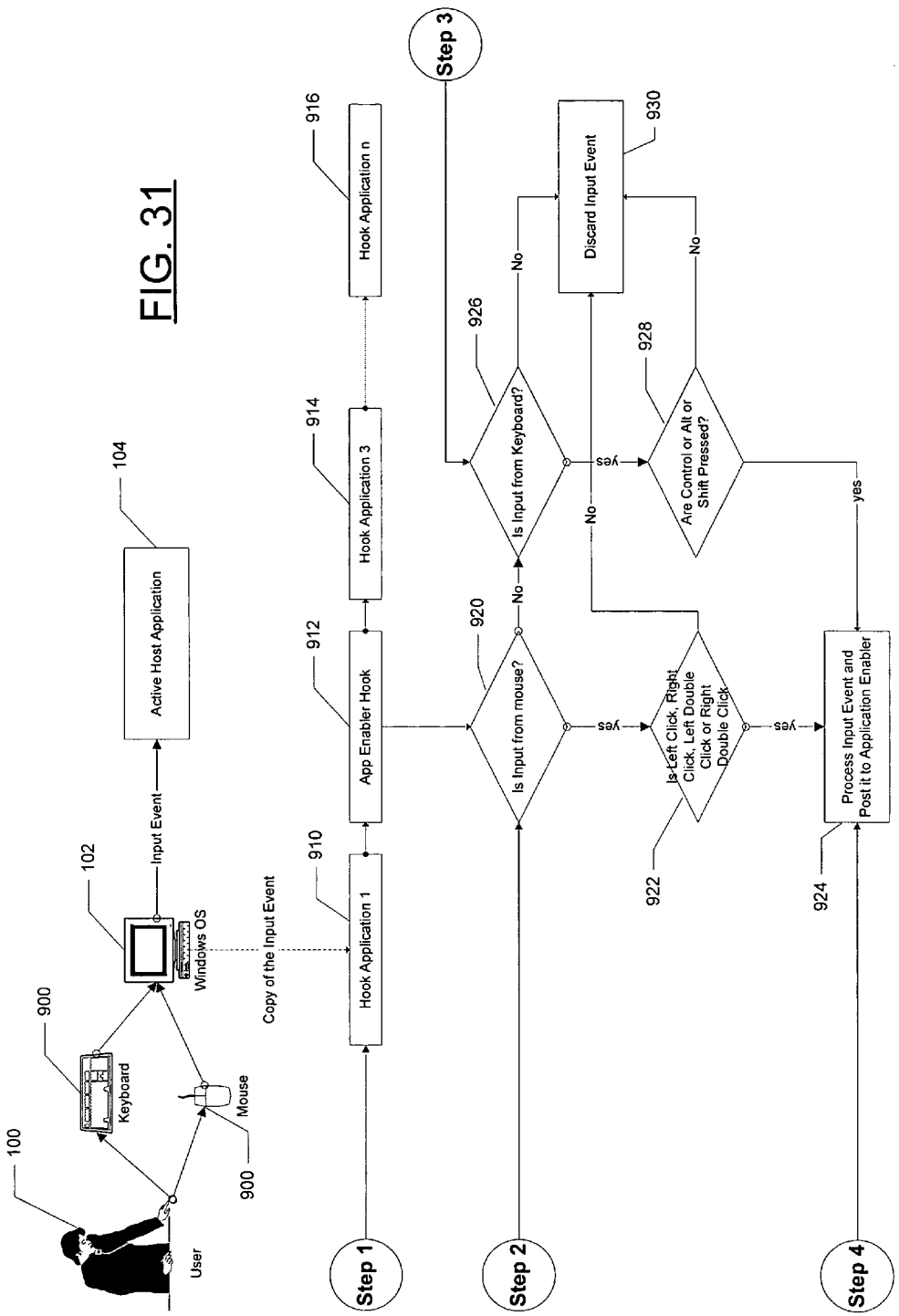

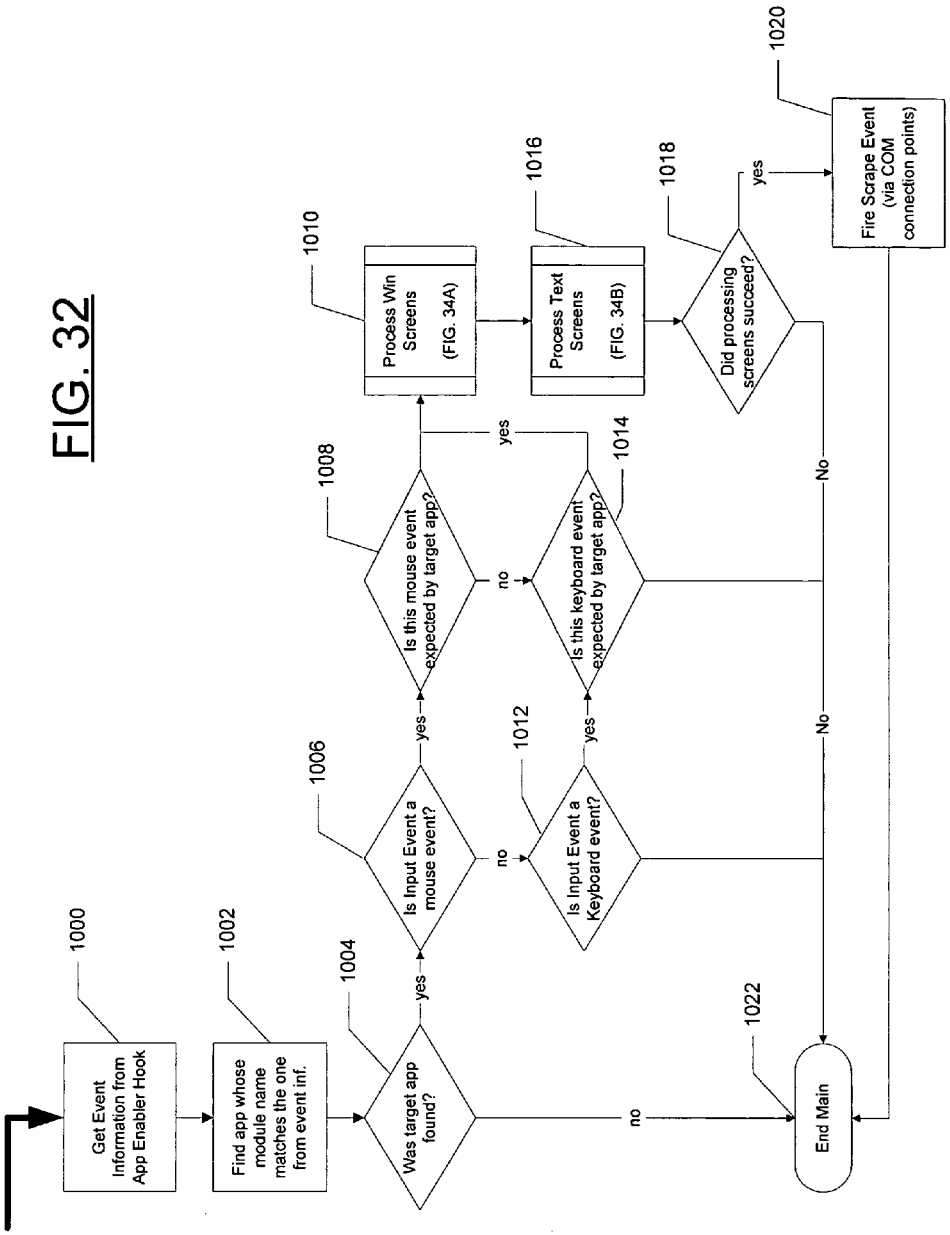

FIG. 37

COMPUTER-IMPLEMENTED DOCUMENT MANAGER APPLICATION ENABLER SYSTEM AND METHOD

CROSS-REFERENCE TO RELATED APPLICATION

This application claims priority to and the benefit of U.S. Provisional Application Ser. No. 60/554,333, filed on Mar. 18, 2004, of which the entire disclosure (including any and all figures) is incorporated herein by reference.

TECHNICAL FIELD

The present invention relates generally to computer-implemented document management systems and more particularly to document image management systems.

BACKGROUND

Companies use document management systems to store and retrieve image documents. Difficulties arise when a company tries to integrate company software systems with a document management system. Programming extensions may be created to act as an interface between the company software systems and the document management system. However, the programming may be complicated and time-consuming as this requires detailed knowledge of the company software systems, the document management system and the API's (application programming interfaces) that are needed for application integration. The difficulties further mount when the company's departments use different types of applications that are needed to access documents from the document management system.

SUMMARY

In accordance with the teachings provided herein, a system and method are provided for retrieving documents stored in a document management system based upon data from an application. While an interface is displayed, associations are created between one or more fields on the application's interface and one or more retrieval-related attributes of the document management system. Data that is subsequently provided for the fields is used to retrieve documents from the document management system based the created associations. The data obtained could also be used for such other operations as generating bar codes, generating indexes for documents to be stored in a document management system, being used when storing documents that may arrive later in a document management system process, creating a document that could be stored in a document management system, or placing documents into a temporary storage location, such as a queue.

BRIEF DESCRIPTION OF THE DRAWINGS

FIG. 22 is a text-based screen illustrating screen location identification;

FIG. 31 is a flowchart depicting an operational flow for obtaining data from a host application about input events;

FIG. 32 is a flowchart depicting an operational flow for processing an input event;

FIG. 37 is a graphical user interface showing a document viewer example;

DETAILED DESCRIPTION

Figure 1:
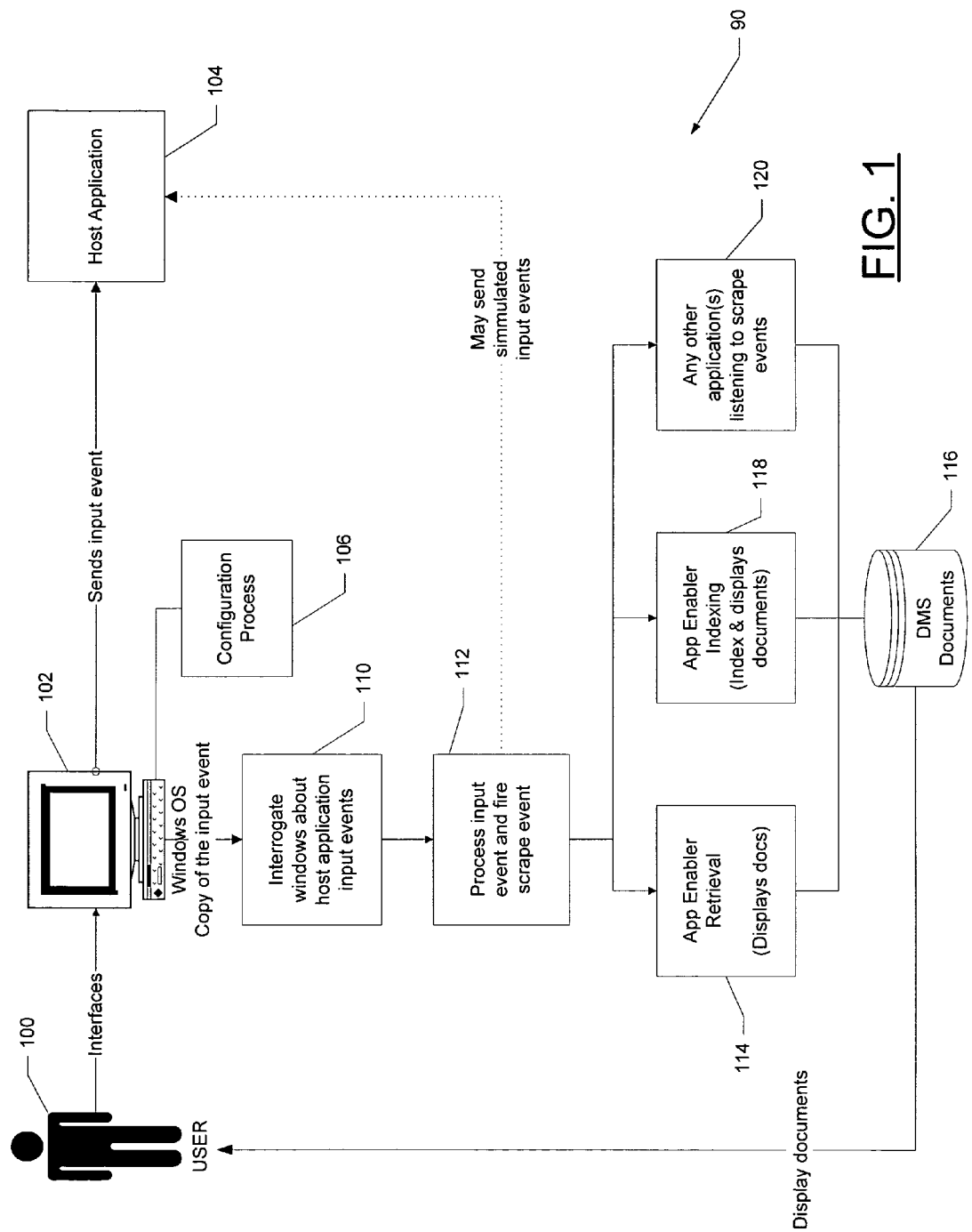
FIG. 1 is a block diagram depicting use of an application enabler system within a document image system.

FIG. 1 depicts a computer-implemented application enabler system 90 that allows users 100 to integrate their document management system 116 with other business systems, such as Windows®-based and terminal emulation applications 104. The enablement of applications 104 provides among other things the ability to retrieve documents from a document management system 116 directly from third-party software 104 (known as host applications) without requiring any or a significant amount of custom programming.

In the system 90, a user 100 may retrieve documents stored in the document management system 116 by performing a keyboard or mouse event on a host application field that contains a keyword value. The keystroke or mouse event that triggers the document search is determined during configuration process 106. The configuration process 106 also links data in host application form fields (or text in a text screen) to related information in the document management system database 116.

The application enabler system 90 provides a generic, configurable approach to retrieving documents from the document management system 116 by connecting to the underlying Windows message loop through process 110. Process 110 interrogates the Windows operating system (OS) 102 for an application's contextual information and data values so that queries can be formed to retrieve documents. The application enabler system 90 also uses process 112 to assemble information about the input event and fire scrape events for use in formulating the document query. Within the application enabler system, the firing of a scrape event means generating a message with the information scraped and forwarding it to another application.

After the input event has been processed and the scrape event fired, various operations may be performed. For example, process 114 may retrieve document management system document(s) while in the host application based upon input event information. The documents found may be listed in a separate window. Selecting any document in the list displays it in its own viewer window. For example, an accounting system could be configured to retrieve documents stored in the document management system. A field containing a P.O. number could be configured to retrieve and display corresponding invoices from the document management system, thereby allowing a user to more easily verify correct billing. It is also noted that cross-referenced files can be displayed in other windows by selecting the appropriate location in the open document.

The application enabler system's indexing process 118 allows users to index the document management system documents directly from the host application 104, thereby eliminating the need to re-key the index information in the document management system 116. During the indexing process 118, a user 110 matches information currently displayed on the host application screen with the document management system document to be indexed. The operator selects a value on the host screen and confirms that the value(s) are correct. The index values are copied to the document management system 116 (such as, FileNET Panagon, IBM Content Manager, and OnBase by Hyland Software, Inc.). There is no limit to the number of keywords or screens that can be used to index a document into the document management system 116. Other applications 120 in different document management systems are allowed to receive scrape events and to process them.

It should be understood that the application enabler system 90 may be used with any type of document management system, such as the OnBase software system from Hyland Software, Inc. (located in Westlake, Ohio). OnBase system electronically captures, stores and manages literally every document generated or received by a company—including paper, reports, application files, e-mails, and web content. The software handles everything a user needs to do with those documents—retrieve, revise, annotate, distribute, or post to a website. It integrates seamlessly with ERP, CRM, and other e-business applications to create a single point of online access to all relevant information. OnBase software combines the technologies of document imaging, COLD/ERM, document management, and workflow into a single, enterprise-class application.

Figure 2:
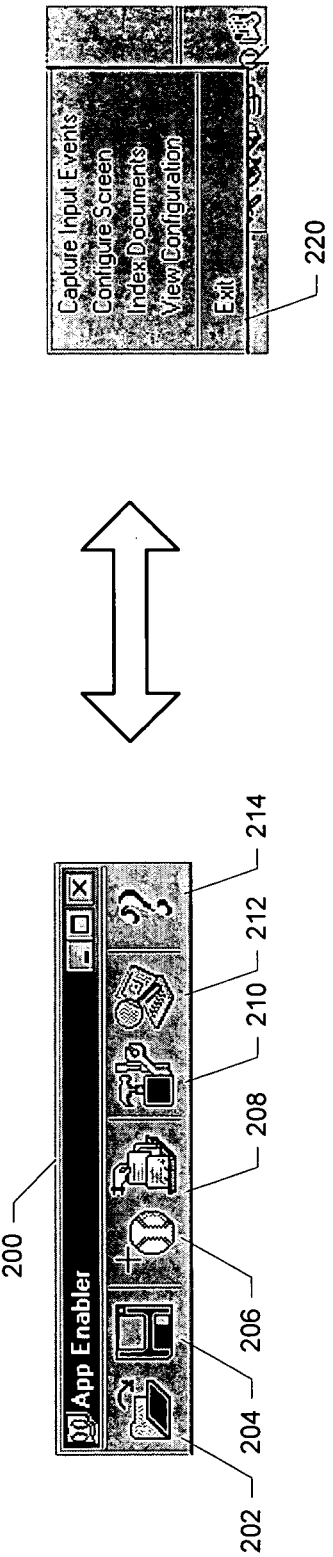
FIG. 2 depicts a toolbar and pop-up interface for use in enabling applications.

The application enabler system may be used with different types of applications, such as but not limited to Windows-based applications and text-based applications. FIGS. 2-17 illustrate configuration and retrieval of the application enabler system for an exemplary Windows-based application. To configure a Windows-based application, a configuration process is performed that creates links between host application data fields and document management keyword types. A user creates links by first opening the application enabler system. The user is presented with a toolbar 200 as shown in FIG. 2 to help in the configuration process (as well as with other enabling processes such as indexing and retrieval). The different functions of the toolbar 200 are as follows: button 202 opens an existing configuration; button 204 saves the current configuration; button 206 toggles input capture event; button 208 indexes documents; button 210 configures screens and applications; button 212 allows enabled applications/configuration to be viewed in a graphical fashion; and button 214 displays program information. It should be understood that many different ways are possible to supply an interface other than through a toolbar interface, such as through a right-mouse click pop-up menu 220 or other ways.

Figure 3:
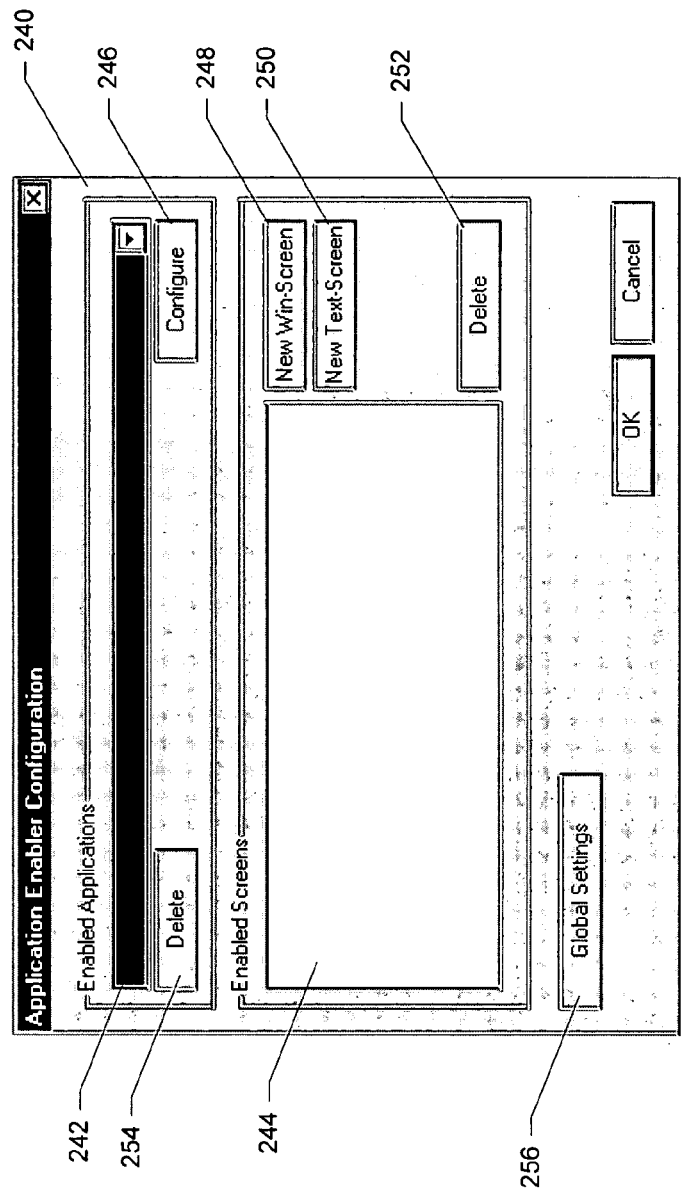
FIG. 3 is a graphical user interface depicting an application enabler system configuration window.

After a user has activated the configuration button 210, the configuration screen 240 of FIG. 3 is displayed and lists any enabled line-of-business applications in region 242 and any Windows-based screens enabled for an application in region 244. In this example, no applications are currently enabled as shown in region 242. This is how a user's configuration screen 240 appears when it is accessed for the first time after installation and when the application enabler system is opened for an initial session.

The buttons on the configuration screen 240 perform the following functions. The Configure button 246 may be activated to change configuration information for previously defined configurations. The New Win-Screen button 248 may be activated to begin enabling a Windows-based application. The New Text Screen button 250 may be activated to begin enabling a text-based application. The Delete button 252 may be activated to delete a selected configuration screen. The Delete button 254 may be activated to delete a selected enabled application. The Global Settings button 256 may be activated to access the preferences displayed on FIG. 4.

Figure 4:
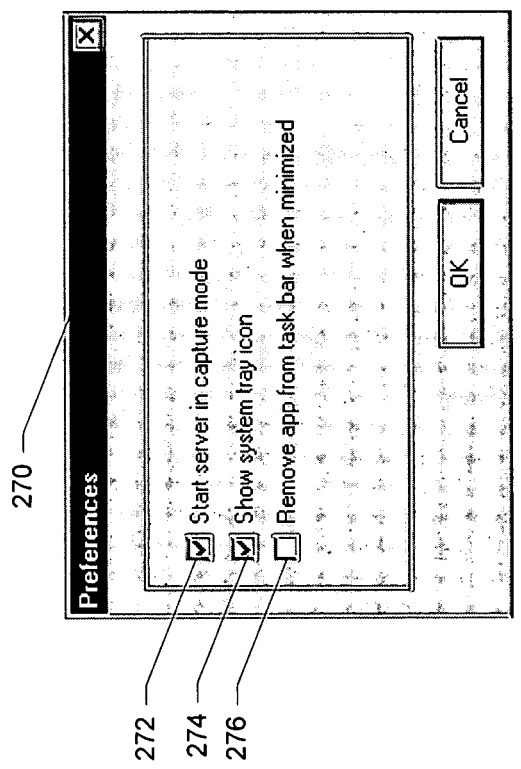
FIG. 4 is a graphical user interface to set preferences for application enabling operations.

With reference to FIG. 4, preferences window 270 contains preference option 272 which is labeled "Start server in capture mode". Preference option 272 automatically enables the capture mode when a saved configuration is opened. Preference option 274 (labeled "Show system tray icon") displays the baseball icon in the system tray when the application enabler system service is running. Preference option 276 (labeled "Remove app from task bar when minimized") removes the application enabler system icon from the task bar when the application enabler system is minimized.

Figure 5:
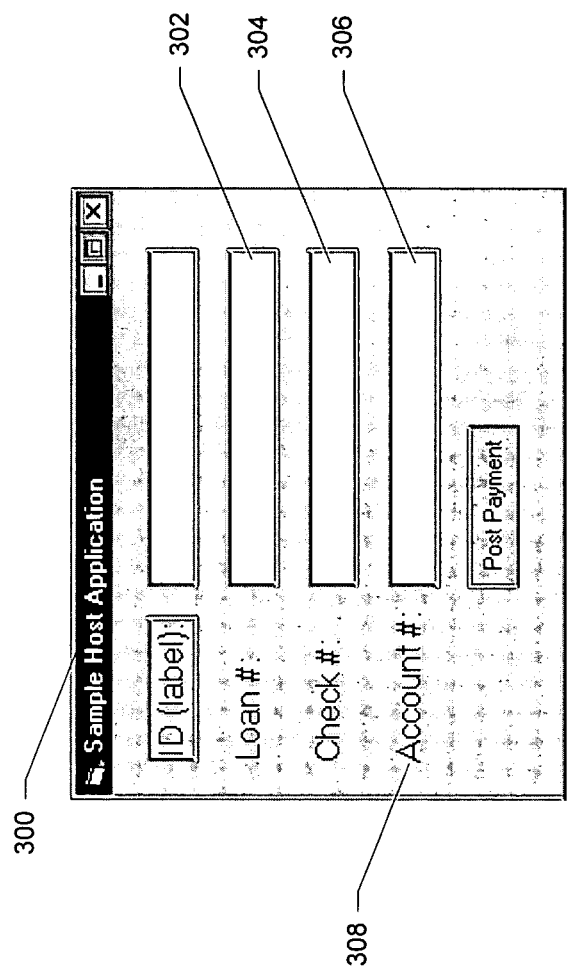
FIG. 5 is a graphical user interface depicting a sample Windows-based host application.

FIG. 5 shows a sample Windows-based host application 300 to be enabled. It should be noted that a host application may include one or more windows of information. In such a situation, a user may choose to enable one or many screens. A screen (such as the one shown in FIG. 5) may be composed of configurable form fields (e.g., Loan # field 302, Check # field 304, Account #306), non-configurable text (e.g., "Account #:" text 308) and other components.

Figure 6:
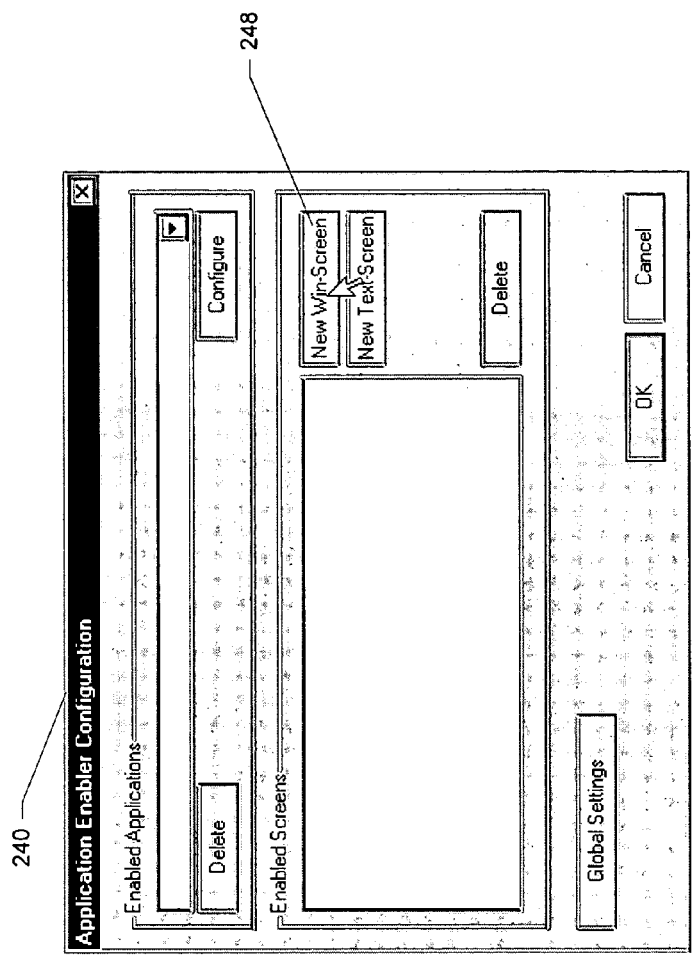
FIG. 6 is a graphical user interface depicting a configuration window for use in configuring the sample host application of FIG. 5.
Figure 7:
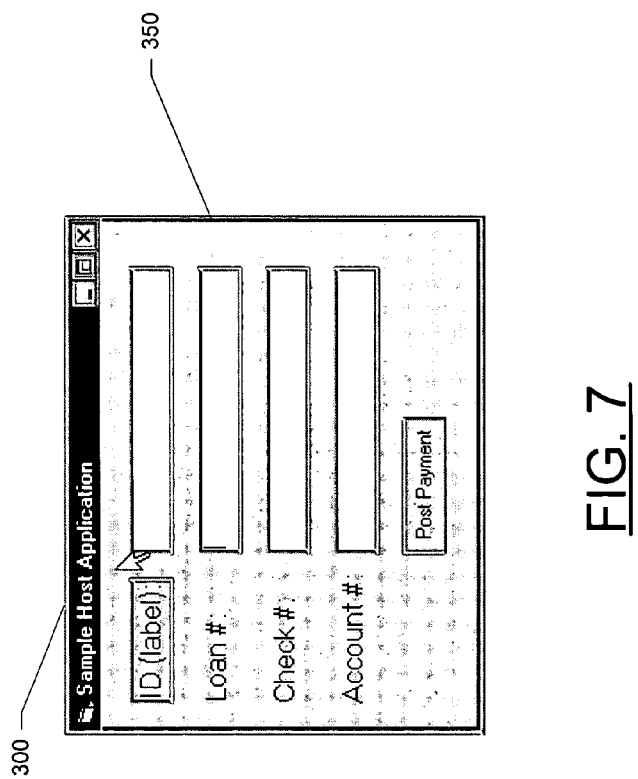
FIG. 7 is a graphical user interface depicting a selection operation within the sample host application.

After the host application 300 is open, a user activates the New Win-Screen button 248 on the configuration 240 screen shown in FIG. 6. After a user presses the button 248, the application enabler system prepares to capture the first input screen that is to be enabled. A graphical user interface device, such as a mouse, is used to select the screen 300 (of FIG. 5) in order for it to be captured. The screen 300 selected by the user is highlighted by a selection box 350 as shown in FIG. 7, which encloses the area selected for capture.

Figure 8:
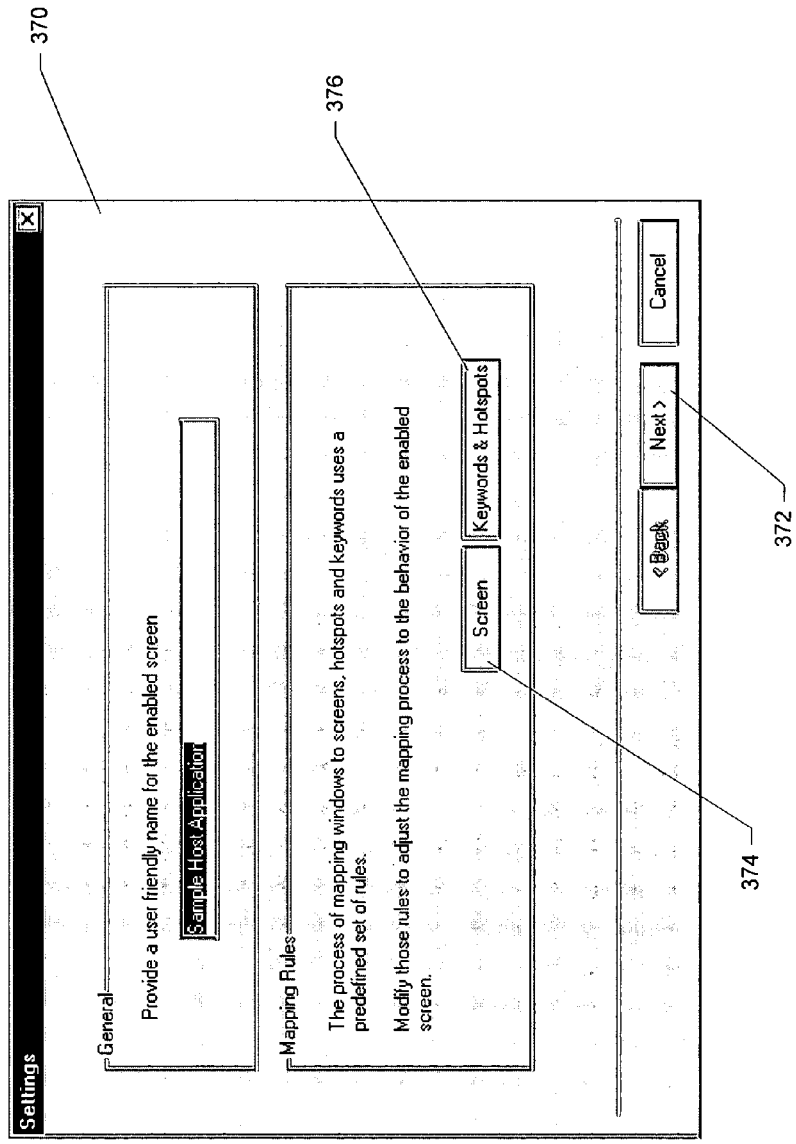
FIG. 8 is a graphical user interface for providing a screen name associated with the sample host application.

The application enabler system interrogates the Windows OS in order to obtain the name of the host application screen. The obtained name is displayed in the settings screen 370 as shown in FIG. 8. The user may alter the displayed name if desired.

The application enabler system uses mappings to identify screens, edit fields, and hot spots. In many cases, including that of the example, the default settings allow the application enabler system to accurately map fields. The default settings are used for the first configuration attempt. If the default settings do not successfully enable the screen, a user may adjust the way the application enabler system identifies screens by clicking the Screen button 374 to thereby allow changes to the following options:

Window ID option—The Window ID is a property that the operating system stores for each screen. Most applications assign a constant, unique Window ID to each of its controls, which allows the application enabler system to use the Window ID to uniquely identify a window within the application. For this reason, the Window ID may be selected as the default way of identifying a screen. When a Window ID is not detected during configuration a value of 0 (zero) is stored as the Window ID. If a user is configuring multiple screens in a single application and more than one of the screens stores a 0, the user may select an alternate way of window identification.

Caption option—Most application screens display a text caption at the top of the screen. If the captions are static, the application enabler system can use them to identify screens. Static captions are captions that do not change based on the set of information currently being viewed or altered in the application. A static caption may be used as an identifier.

Metrics option—Some applications display screens within a parent window. When enabling this type of application, the application enabler system can use the position of the screen within the parent window to identify the screen.

Absolute Position option—If the screen is always displayed in the exact position (measured in millimeters) from the top or bottom of the parent screen, an absolute measurement can be used. For example, if a parent window cannot be resized horizontally, the application screen will always be located an equal distance from the left margin of the parent screen. If a parent window cannot be resized vertically, the application screen will always be located an equal distance from the top of the screen.

Relative Position option—If the host application parent window can be resized and the screen within it is resized by an equal height/width ratio, the application enabler system can use the relative position of the screen as an identifier. The relative position is measured as a percentage of the length or height of the parent window.

The application enabler system also uses mappings to identify edit fields and hot spots. A user may also alter the rules used to perform field mappings. A user clicks the Keywords & Hotspots button 376 to adjust the way the application enabler system identifies edit fields. If the default settings do not successfully enable the edit fields, the mapping rules options allow a user to alter the rules used to perform field mapping:

Window ID option—The Window ID is a property that the operating system stores for each edit field. Most applications assign a constant, unique Window ID to each of its controls, which allows the application enabler system to use the Window ID to uniquely identify an edit field within the application. For this reason, the Window ID may be selected as the default way of identifying a field. When a Window ID is not detected during configuration, a value of 0 (zero) is stored as the Window ID. If a user is configuring multiple fields on a single screen and more than one of the screens stores a 0, a user may select an alternate way of field configuration.

Metrics option—The location of edit fields can be used to identify fields and hot spots. The application enabler system can use the position of the edit field on the screen to identify the field.

Absolute Position option—If the edit field is always displayed in the exact position (measured in millimeters) from the top or bottom of the screen, an absolute measurement can be used. For example, if an application screen cannot be resized horizontally, the application screen will always be located an equal distance from the left margin of the parent screen. If a screen cannot be resized vertically, the application screen will always be located an equal distance from the top of the screen.

Relative Position option—If the application screen can be resized and the edit field is resized by an equal height/width ratio, the application enabler system can use the relative position of the field as a field identifier. The relative position is measured as a percentage of the length or height of the application screen.

Order option—In most applications, the order in which the operating system and the application communicate to each other is always the same. A user may choose this option if the Window ID is not always the same.

Figure 9:
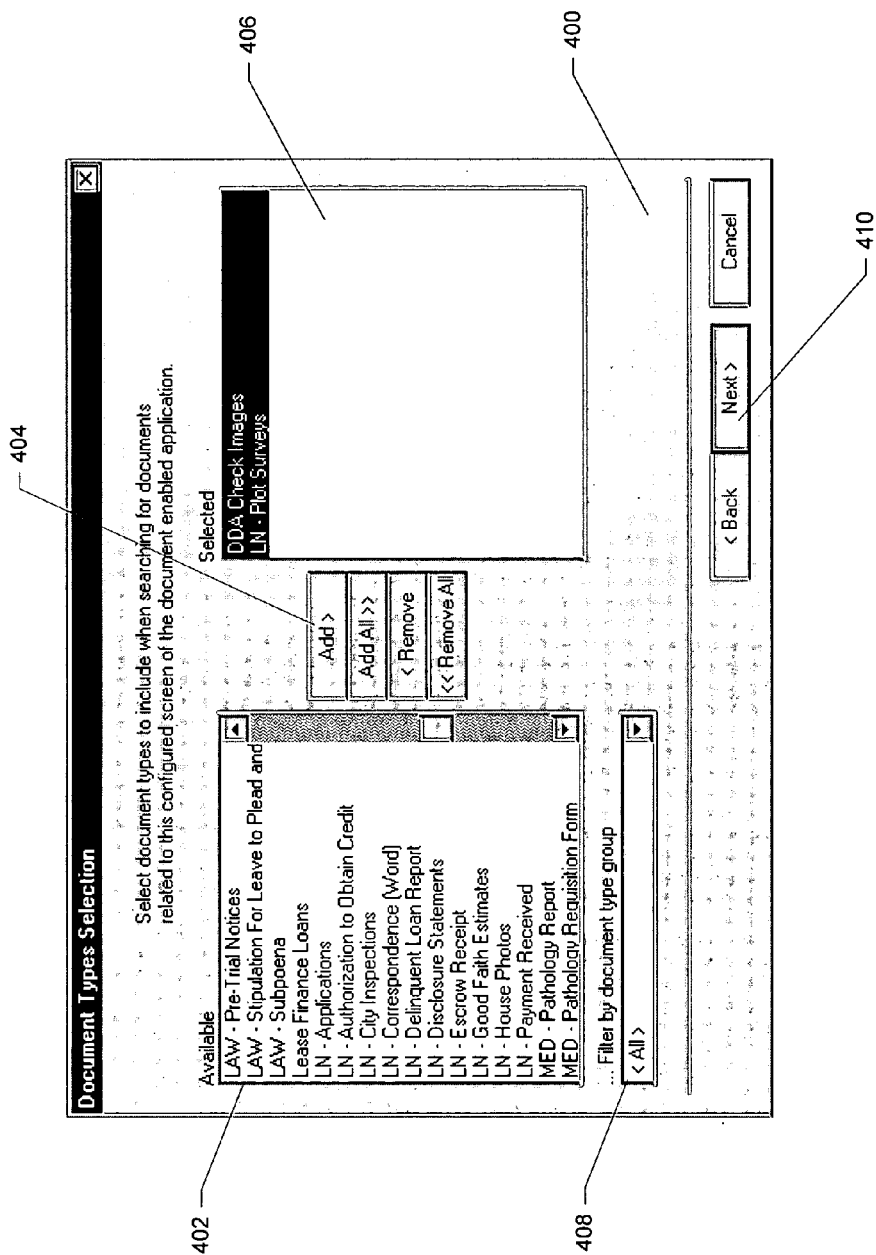
FIG. 9 is a graphical user interface for selection of document types.

After the mapping rules are established, a user selects via the interface 400 of FIG. 9 the document types to be searched when retrieving document management system documents from the host application. A user selects document types from the Available list 402 and clicks the Add button 404 to add them to the Selected list 406. To filter available documents by document type group, a user selects a document type group from the Filter by document type group selection box 408 and clicks the Next button 410 to continue.

In this example, the user wishes that Plot Surveys are to be retrieved based on loan number and check images are also to be retrieved based on Account #, Check Serial #, or Loan #.

Thus, the user has selected for this example the document types as DDA Check Images and LN-Plot Surveys in the Selected list 406.

Figure 10:
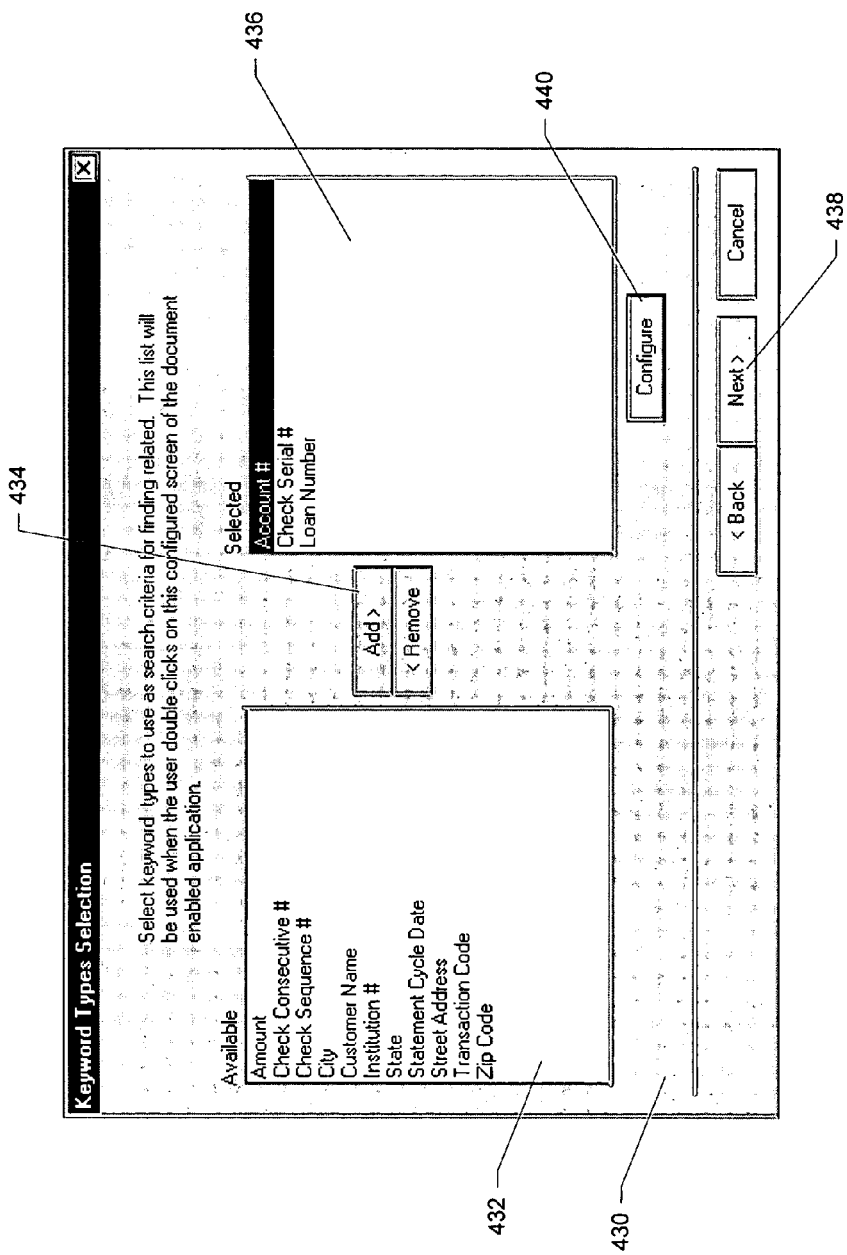
FIG. 10 is a graphical user interface for selection of key word types.
Figure 11:
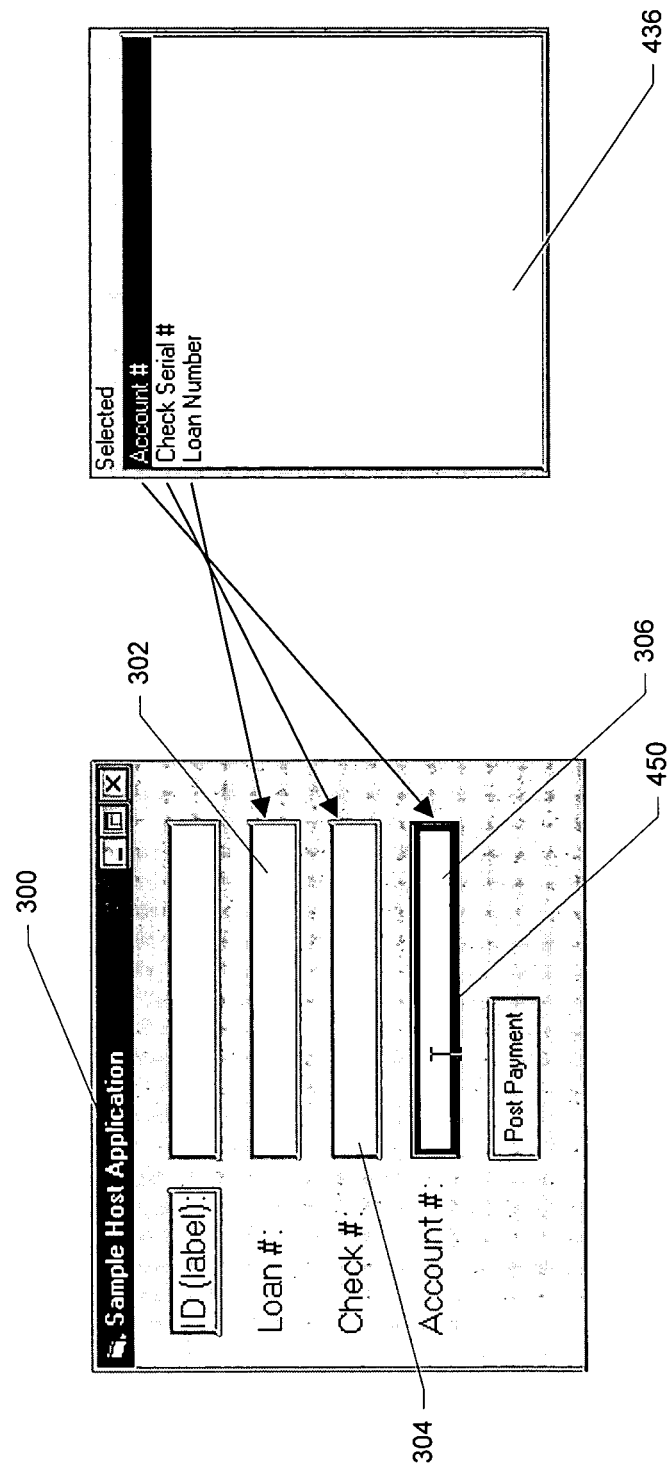
FIG. 11 is a graphical user interface for identification of corresponding key words with the sample host application.

The Keyword Type Selection dialog interface 430 appears as displayed in FIG. 10. The keyword types available for selection are keyword types associated with the document types selected on the previous screen. A user selects each keyword type that is to be associated with the host application by clicking on the keyword type in the Available list 432 and clicking the Add button 434 to add the selected key word to the Selected list 436.

After each keyword is selected, a user is allowed to move their mouse until a selection line encloses the host application field that is to be associated with a keyword value. In the example shown in FIG. 11, the Account # entry in the Selected list 436 is selected. A user clicks on the desired field (e.g., Account #306), and a selection line 450 encloses the field 306. The user is then returned to the Selected list screen 436. The selection process is repeated for each field to be mapped. As shown in FIG. 10, the user clicks the Next button 438 to continue, or the Configure button 440 to set the character stripping options described below.

Figure 12:
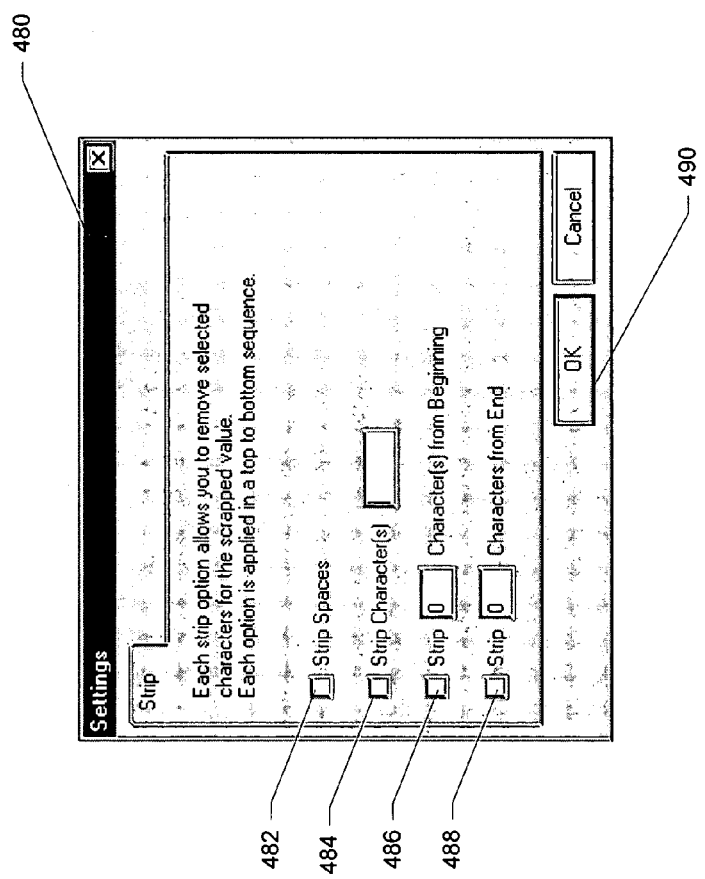
FIG. 12 is a graphical user interface for possible character stripping operations.

If the Configure button 440 is selected for a particular key word in the list 436, then the interface 480 of FIG. 12 is displayed. The interface 480 is used if a user wishes to retrieve documents based on a subset of characters within a value. The interface 480 allows a user to configure the application enabler system to "strip" characters to exclude from the search. For example, if a host application field contains a full phone number and a user wishes to retrieve document management system documents based on area code, the user configures the interface 480 so that the character stripping removes all but the area code from the host field.

Various stripping options may be provided, such as the ones shown in FIG. 12. The Strip Spaces option 482 removes all spaces from the host value, regardless of the location of the spaces. For example, if Strip Spaces is selected, double-clicking on a properly configured host field containing 2_2___ 16_44___ (where "_" represents a space) will return document management system documents with the keyword value 2221644. The Strip Characters option 484 strips all occurrences of a specific character from the host value, regardless of the location of the character within the value. A user enters the character the user wishes to strip in the edit field following the selection box. This option could be used to strip all dashes from a Social Security Number or Account Number. The Strip # Character(s) from Beginning option 486 strips a specific number of characters from the beginning of a value (where # represents the numeric value a user specifies). For example, Strip 5 Characters from Beginning could be used to strip a 3-digit area code enclosed in parentheses (###) from a telephone number. The Strip #Character(s) from End option 488 strips a specific number of characters from the end of a value. The sequence of the specified stripping operations may be of any order. In a top-down stripping implementation, the application enabler system may first strip spaces (if checked) then strip characters (if checked) and so on.

When a user completes the selection process, the user clicks the OK button 490 to return to the Keyword Type Selection screen 430 of FIG. 10. The user clicks the Next button 438 to continue to the hot spots Configuration screen. A user may wish to configure a host application with hot spots. A hot spot enables a host application edit field to return a subset of documents based on information specific to a single field. For example, to enable the host application shown in FIG. 13 to return documents based on a value in the Account Number field 306 only, a user may configure the Account Number field 306 as a hot spot. If no hot spots have been configured on the host application, document management system documents are retrieved if document keyword values match all enabled fields on the host application screen.

Figure 13:
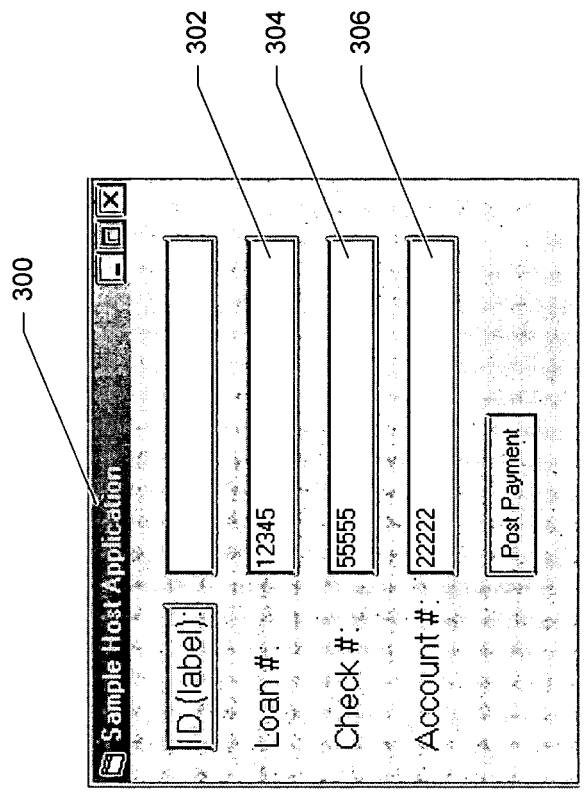
FIG. 13 is a graphical user interface for configuration of optional hot spots within the sample host application.

As an illustration if the screen 300 on FIG. 13 were not hot-spot enabled, only documents with keyword values matching a Loan # of 12345, and Check # of 5555 and an Account # of 22222 are returned when a user clicks on the Account # field. If a hot spot were enabled for Account #, Documents with an Account # of 22222 are returned, regardless of the Loan # and Check #.

Figure 14:
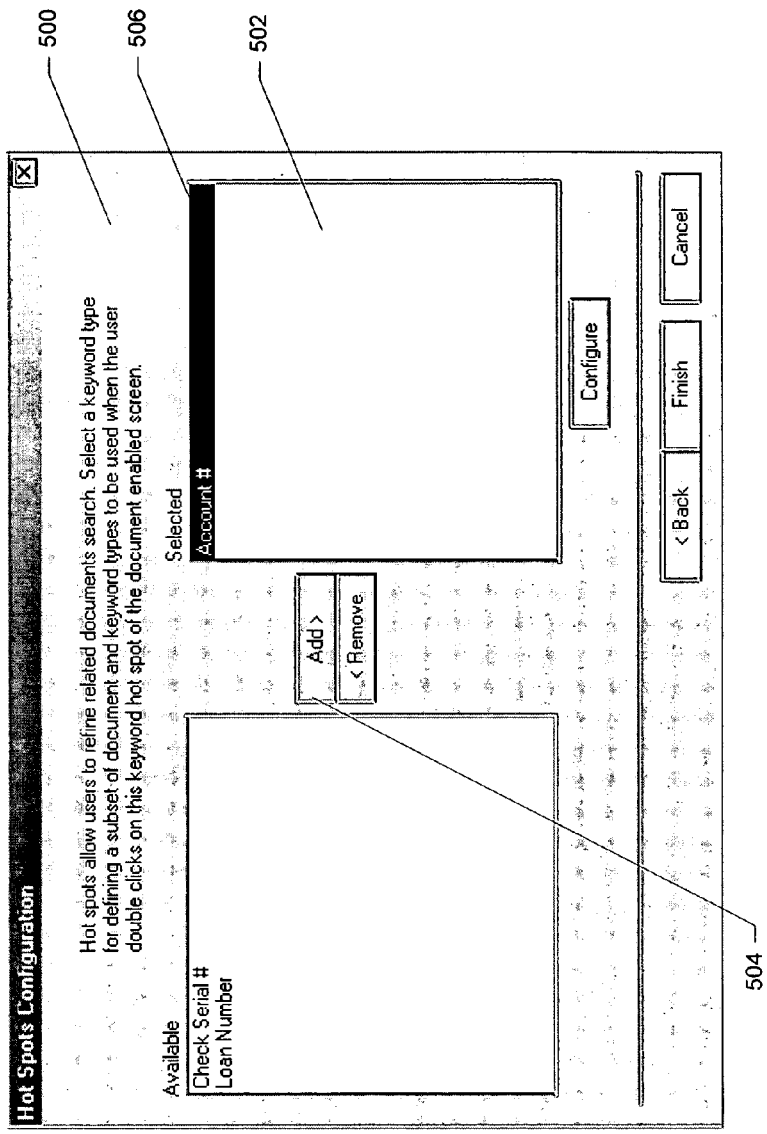
FIG. 14 is a graphical user interface for configuration of hot spots with respect to one or more key word types.

The hot spots screen 500 of FIG. 14 is used to define a hot spot for application fields. With reference to FIG. 14, a user selects an application field from the list 502 of available fields (which are identified by the keyword types currently mapped to the field), and clicks the Add button 504. In the example of FIG. 14, Account #506 is selected as a hot spot. Recall that in the example, Check Images are to be retrieved based on Account #, Check Serial #, and Amount. Therefore, the document type DDA Check Images is specified as the hot spot document type.

Figure 15:
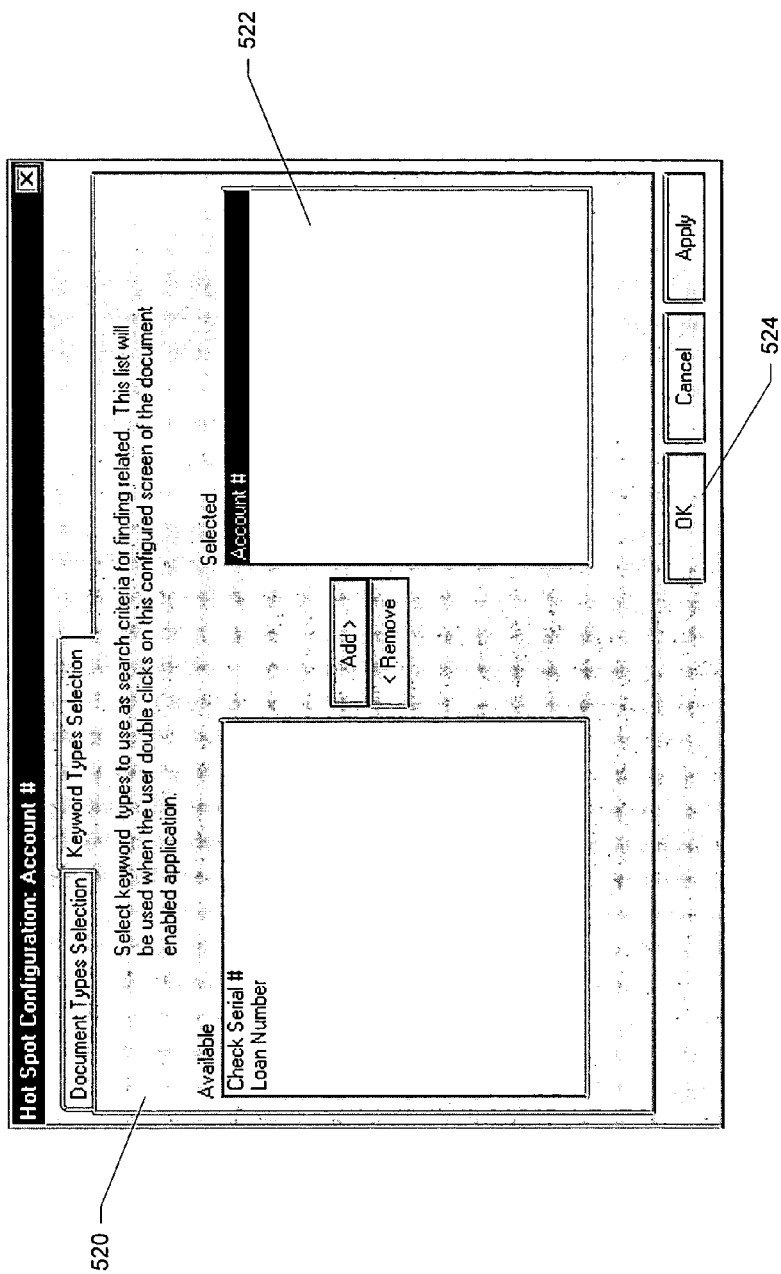
FIG. 15 is a graphical user interface depicting selection of keyword types.

Interface 520 of FIG. 15 is used to associate one or more keyword types with the hot spot. In the following example, the application enabler system is enabled to retrieve all documents based on the Account # when a user double-clicks on the hot spot due to this field being added to the Selected list 522. A user clicks the OK button 524 when the selection is complete. The application enabler system returns a user to the list of keywords. The hot Spot configuration steps are repeated for each hot spot to be configured.

Figure 16:
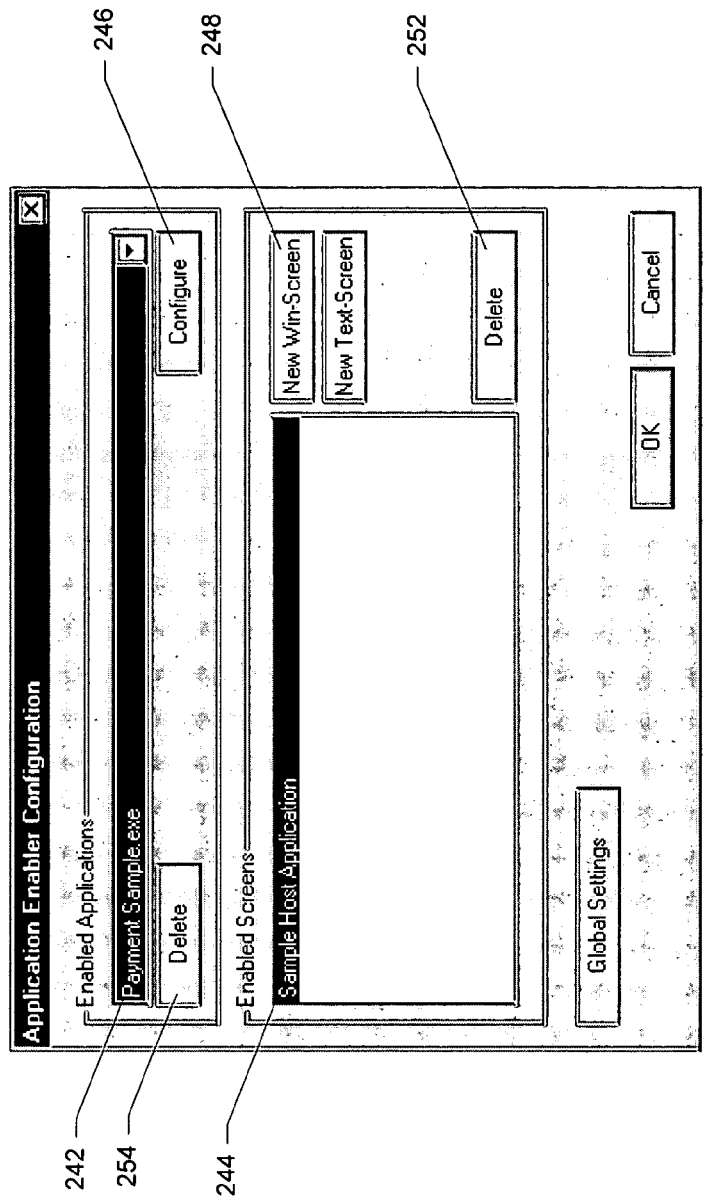
FIG. 16 is a graphical user interface depicting which screens are enabled in the example.

After the configuration process has completed, the enabled application and associated enabled screens are displayed respectively at 242 and 244 on FIG. 16. If a user wishes to enable a new screen for this application, a user clicks the New Win-Screen button 248 and repeats the configuration steps described above. To delete a configuration for an entire application, a user selects the application and clicks the Delete button 254. To delete a screen, a user selects it and clicks the Delete button 252. A user clicks the Configure button 246 on FIG. 16 to define the mouse or keyboard events used to trigger document retrieval.

Figure 17:
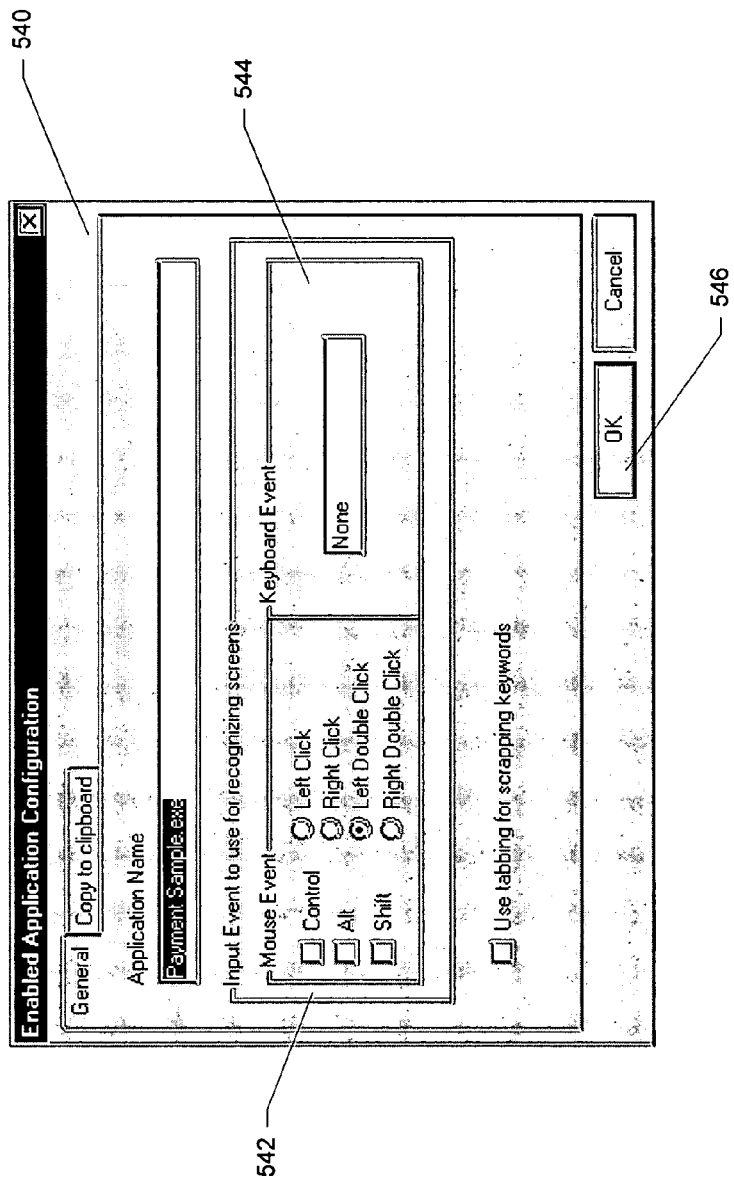
FIG. 17 is a graphical user interface depicting configuration for mouse and/or keyboard events.

After the Configure button 246 is activated, the screen 540 of FIG. 17 is displayed to the user. With reference to FIG. 17, a user selects at 542 the mouse "click event" used to trigger a search (Left Click, Right Click, etc.). A user can choose to use a combination of keystroke and click event by selecting the Ctrl, Alt, or Shift keys in addition to a click event.

To define a keyboard event for triggering a search, a user places at 544 their cursor in the keyboard event field and types the desired keystroke or keystroke combination. For example, a user may press Ctrl and F5 simultaneously to define Ctrl+F5 as a keystroke combination. A user clicks the OK button 546 when the configuration is complete. It is noted that Mouse/Keyboard events can be changed after configuration. A user may open an existing configuration and choose an alternate event and follow the steps described above. A user saves the configuration by clicking on the Save the current configuration button on the application enabler system toolbar, or by choosing the right-click option from the application enabler system shortcut residing in the system tray. A user may close the application enabler system so the new configuration file can be loaded into memory. The configuration file is opened using the Open an existing configuration button on the application enabler system toolbar. A user may enable the event capturing process in order to test the configuration for ensuring that it retrieves the desired documents.

Figure 18:
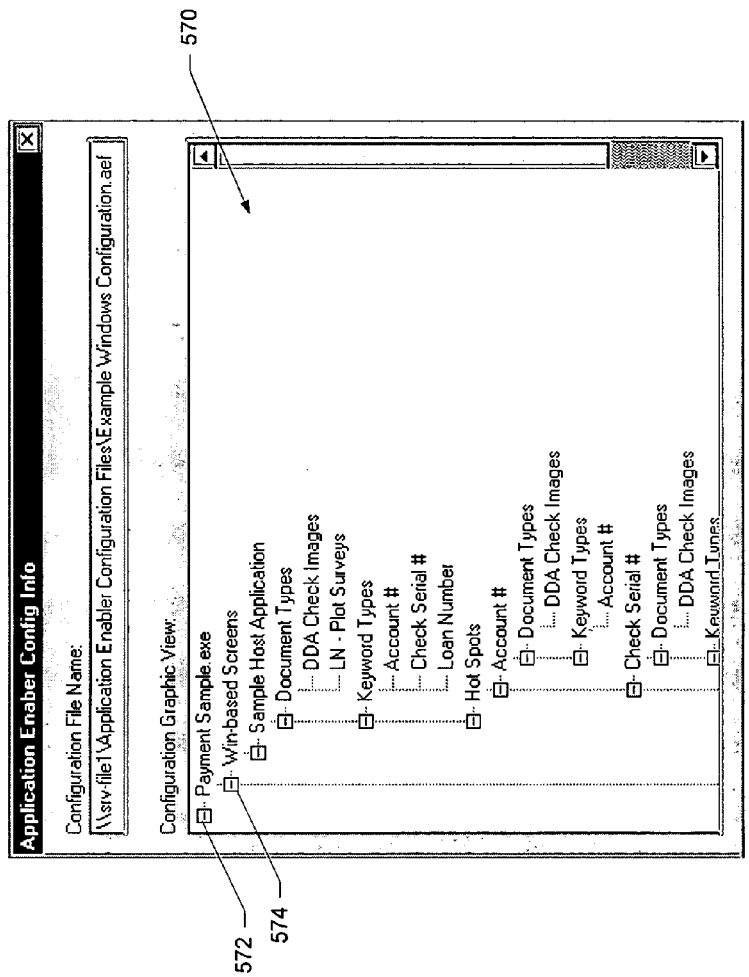
FIG. 18 is a graphical user interface for viewing configurations.

To view a graphical representation of a completed configuration, a user opens an existing configuration and clicks on the View Enabled Applications button. An expandable list displays a graphical view of the configuration, like the example shown in FIG. 18. With reference to FIG. 18, a hierarchical graphical view is displayed at 570 for a sample application 572. Window-based screens are located within collapsible entry 574. Any document types, keyword types, or hot spots are shown for the enabled screens. Note that if the sample application contained any text-based screens, those screens would be contained within the hierarchy 570.

Figure 19:
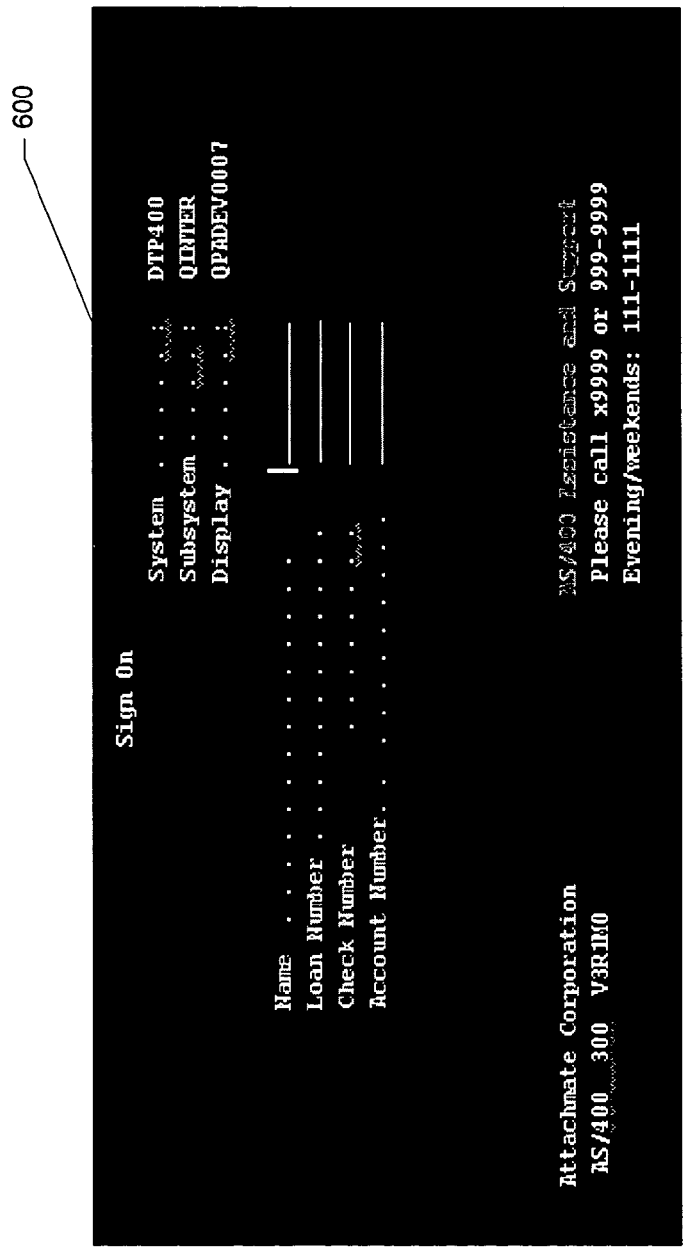
FIG. 19 is a text-based screen of a host application.
Figure 20:
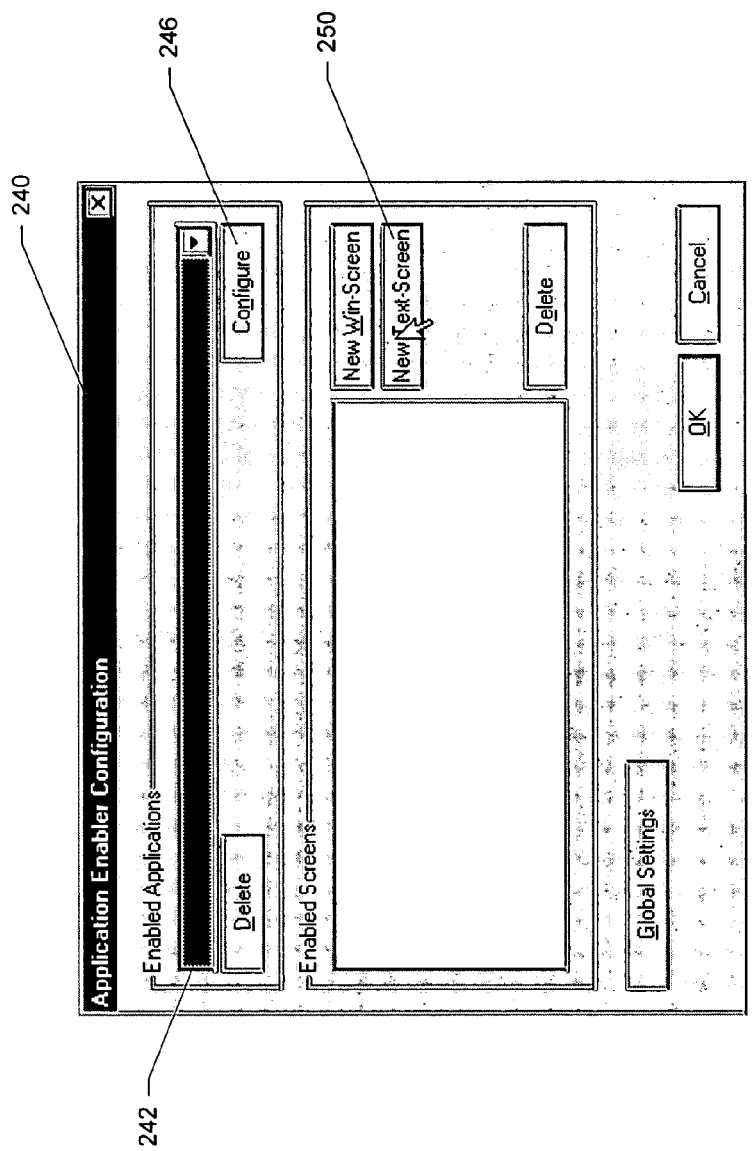
FIG. 20 is a graphical user interface for configuring the text-based host application of FIG. 19.
Figure 21:
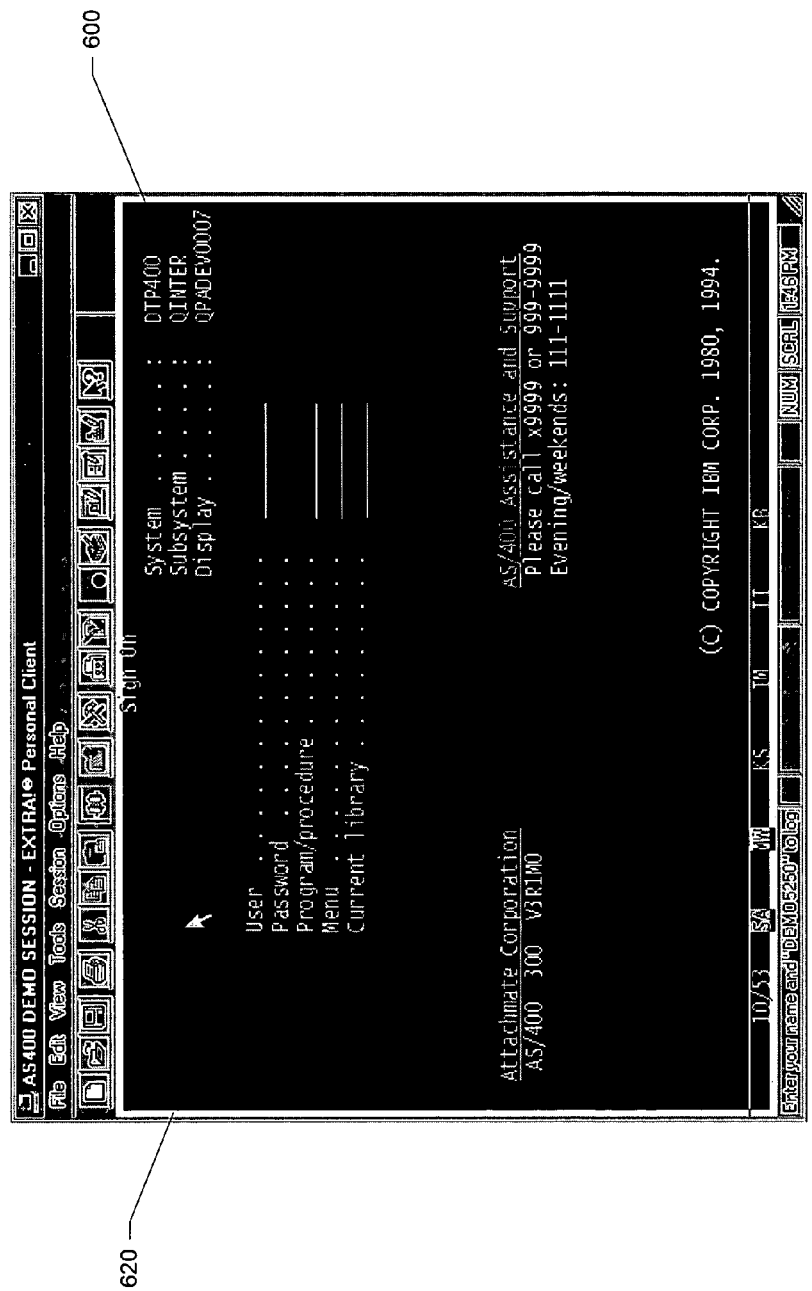
FIG. 21 is a text-based screen showing identification of the text-based screen for enablement.

The application enabler system may be used with applications other than Windows applications, such as with text-based applications. FIGS. 19-28 illustrate configuration and retrieval of the application enabler system for an exemplary text-based application. With reference to FIG. 19, a text-based host application 600 to be enabled is first opened. A user activates the New Text-Screen button 250 on the Configuration screen 240 shown in FIG. 20. After this button 250 is activated, the application enabler system prepares to capture the first screen to be enabled. To identify the text screen that is to be enabled, the user moves the mouse until the selection box encloses the entire host application screen and selects it. In the example shown in FIG. 21, the selection box 620 appears as a white line around the application.

A user chooses a unique text string as a screen identifier. The application enabler system distinguishes each screen by the value provided. The screen is identified by locating a unique text string. In the example shown in FIG. 22, Loan Information is a unique text string located on line one, column thirty-six. This sample application identifies the current location of the cursor by line and column coordinates shown at the bottom of the screen 600. A user confirms the status line information at the bottom of the screen 600.

Figure 23:
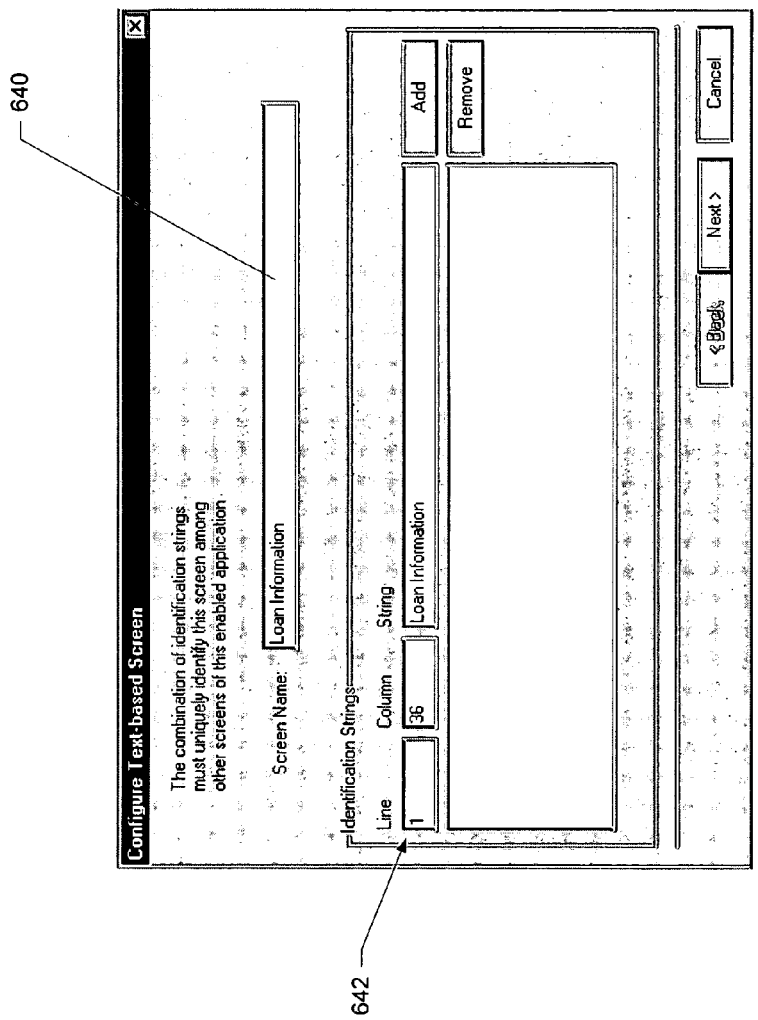
FIG. 23 is a graphical user interface for providing screen attribute information.

A user enters the Screen Name at 640 as shown in FIG. 23. Identification strings for the screen are entered at region 642. For example, the user enters the Line number, Column number and characters contained in the String "Loan Information". The user may add as many text strings as necessary to uniquely identify this screen.

Figure 24:
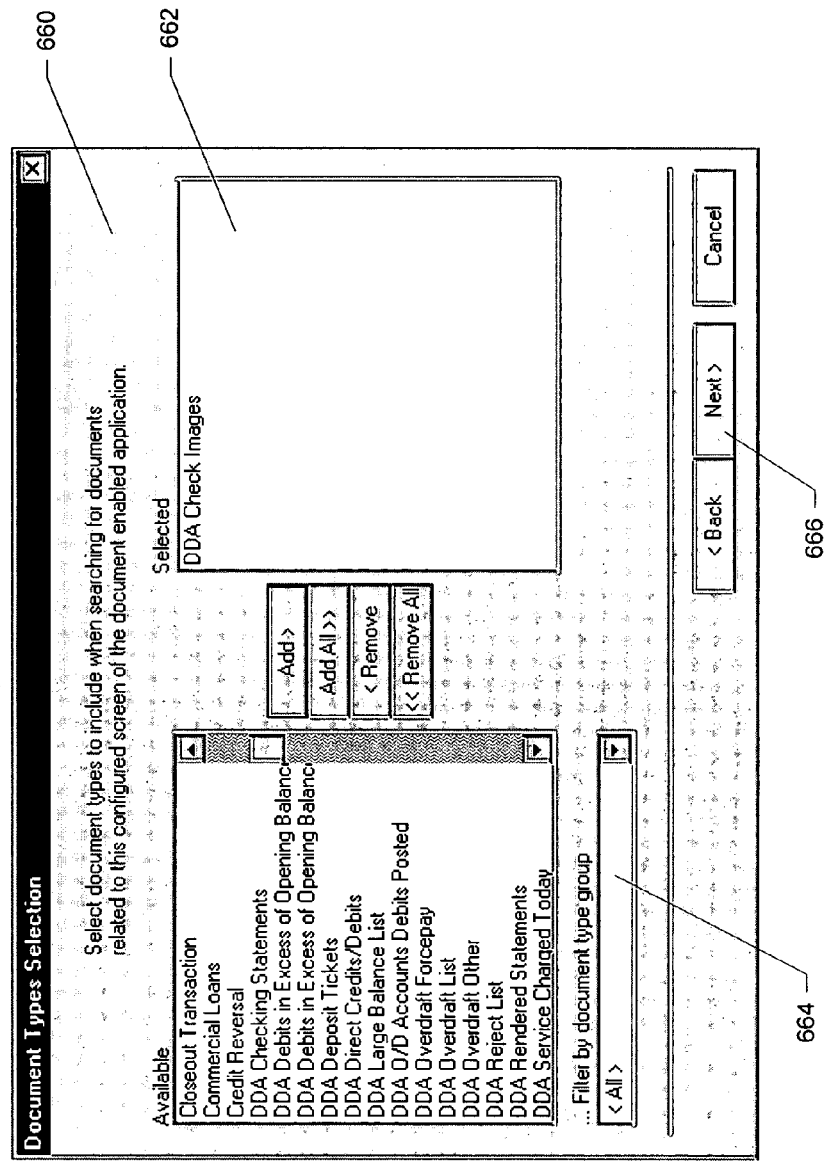
FIG. 24 is a graphical user interface depicting selection of document types.

After the text-based screen is enabled, the screen 660 of FIG. 24 is displayed in order to select document types to include when searching for documents related to the configured screen. The user adds to the Selected list 662 the document types a user wishes to search when retrieving document management system documents from the host application. In this example, check images are to be retrieved based on Account # and Check #. The document type in the example is DDA Check Images. To filter available documents by document type group, the user selects a document type group from the Filter by document type group selection box 664. The user clicks the Next button 666 to continue.

Figure 25:
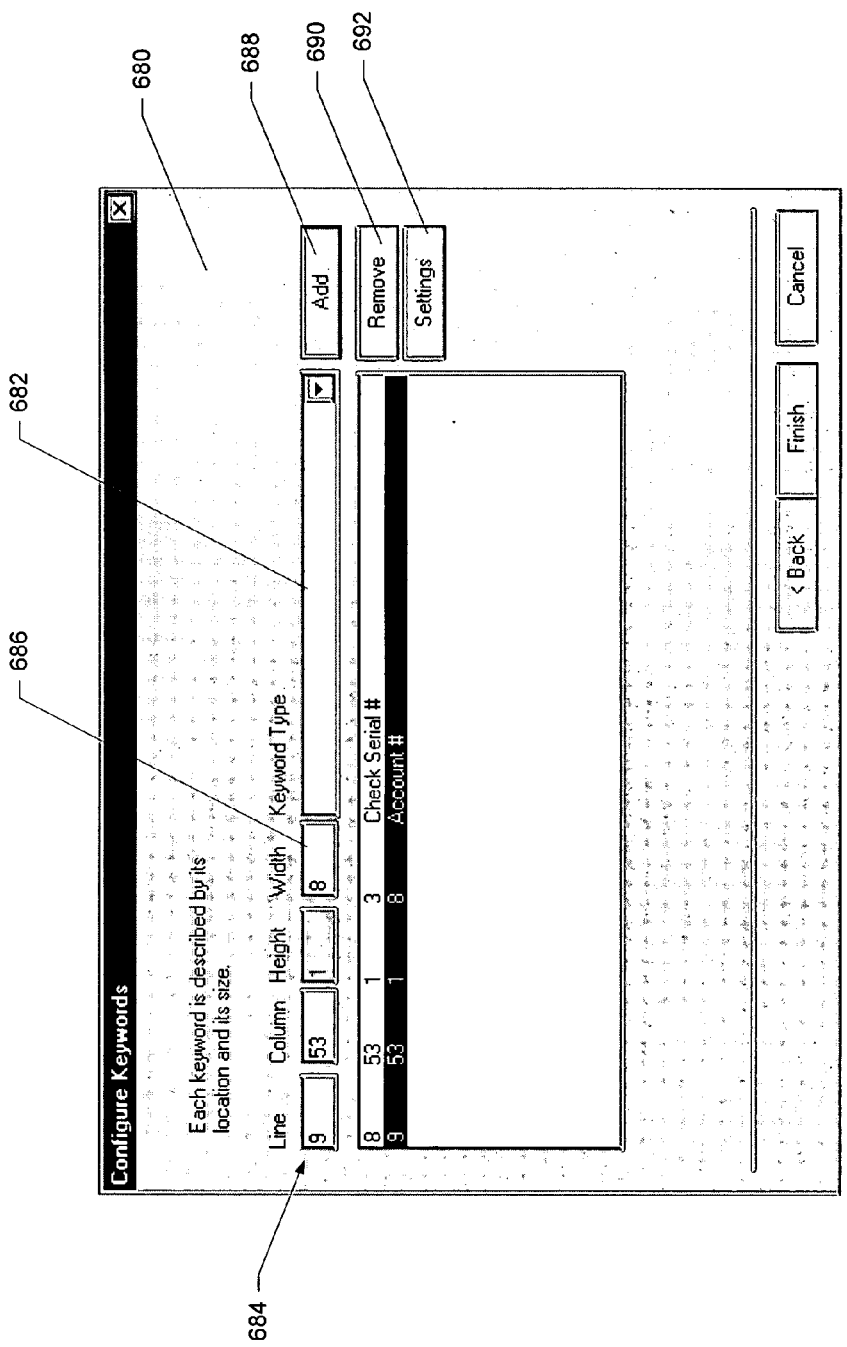
FIG. 25 is a graphical user interface depicting configuration of key words for the text-based screen.
Figure 26:
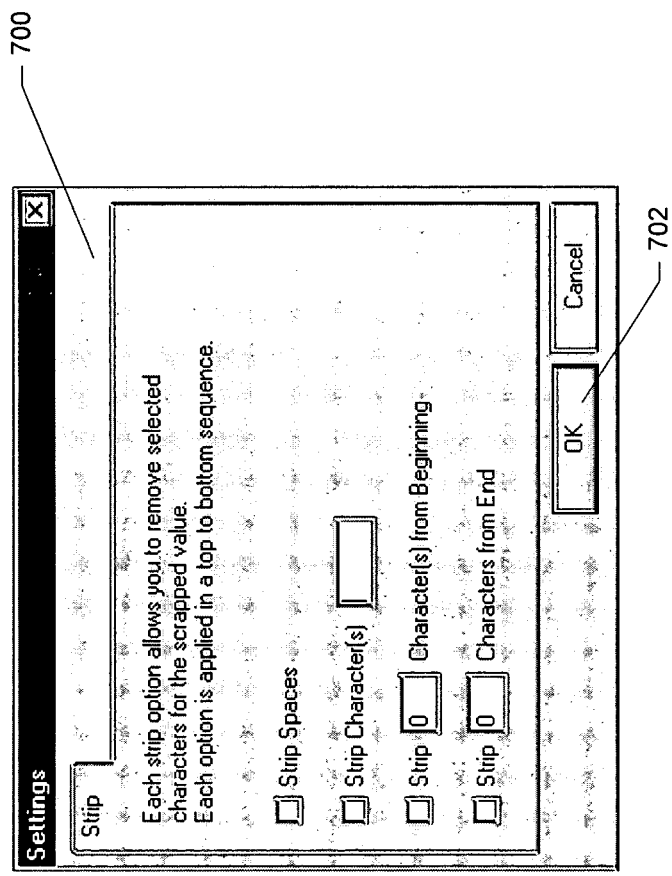
FIG. 26 is a graphical user interface for possible character stripping operations.

FIG. 25 exemplifies at 680 for the text-based application how the screen location of each keyword value that is to be used as a search may be identified. The user selects each keyword type from the dropdown list 682. The user identifies at 684 the Line and Column location of the keyword on the host screen. A user enters at 686 the maximum width of the keyword value. The width can be longer than the value as long as it does not overlap any other text. The user clicks the Add button 688 to add new keyword types. The user may also click the Remove button 690 to remove keyword types. The Settings button 692 is activated to set the character stripping options for each keyword value. The Settings Dialog interface 700 is displayed in FIG. 26. A user clicks the OK button 702 when the configuration is complete.

Figure 27:
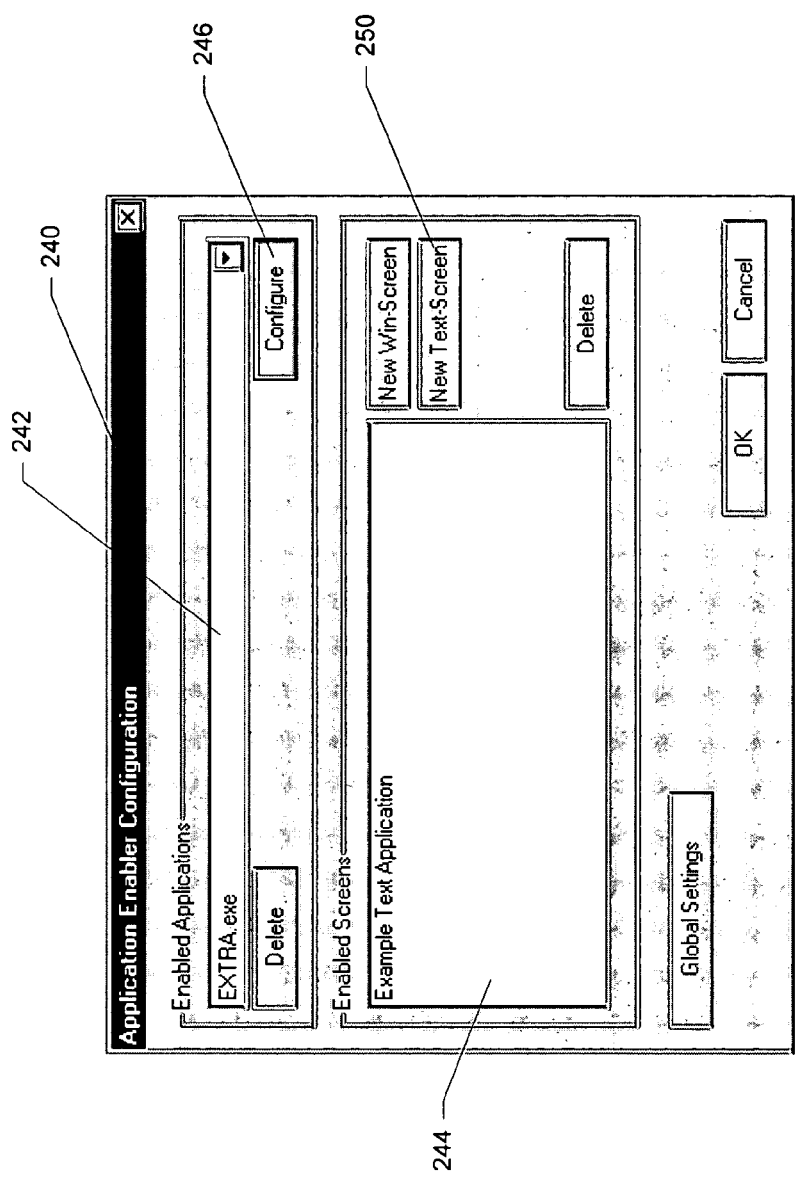
FIG. 27 is a graphical user interface depicting which applications have been enabled.

The screen 240 in FIG. 27 shows the enabled application 242 (Extra.exe) and the list of enabled screens 244 for that application. If a user wishes to enable a new screen for this application, a user clicks the New Text-Screen button 250 and repeats the configuration steps described above. A user clicks the Configure button 246 on FIG. 27 to access the General tab 710 and Copy to clipboard tab 712. The General tab 710 defines the Mouse and or Keyboard Events used to trigger document retrieval.

Figure 28:
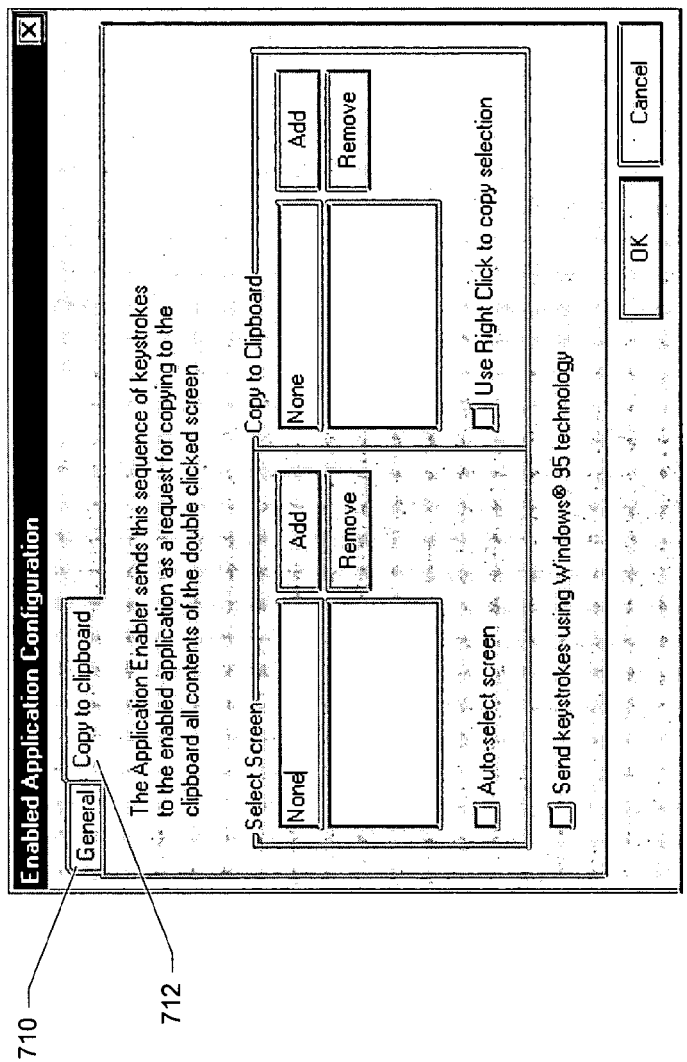
FIG. 28 is a graphical user interface for allowing copy to clipboard operations to occur.

The application enabler system identifies text-based screens and screen data by the line and column location of characters on the text screen. In order to accurately map characters, the application enabler system copies each configured text screen to the windows clipboard. The Copy to clipboard tab 712 as shown in FIG. 28 allows a user to define which keystrokes are used to select a screen and copy to the keyboard. In most cases, text-based applications will enable when the standard CTRL-A (select all) and CTRL-C (copy all) are used. Some applications may require alternate keystroke combinations. A user enters the desired keystroke combination in the text field below Select Screen and Copy to Clipboard, and clicks the Add button.

Alternately, some applications require the use of Auto-select screen to copy text to the clipboard. In this case, the user selects the Auto-select screen check box. Some applications may require that a user right-clicks to copy to the clipboard. In this case, a user selects the Use Right Click to copy selection check box. A user clicks OK to save the selections.

Figure 29:
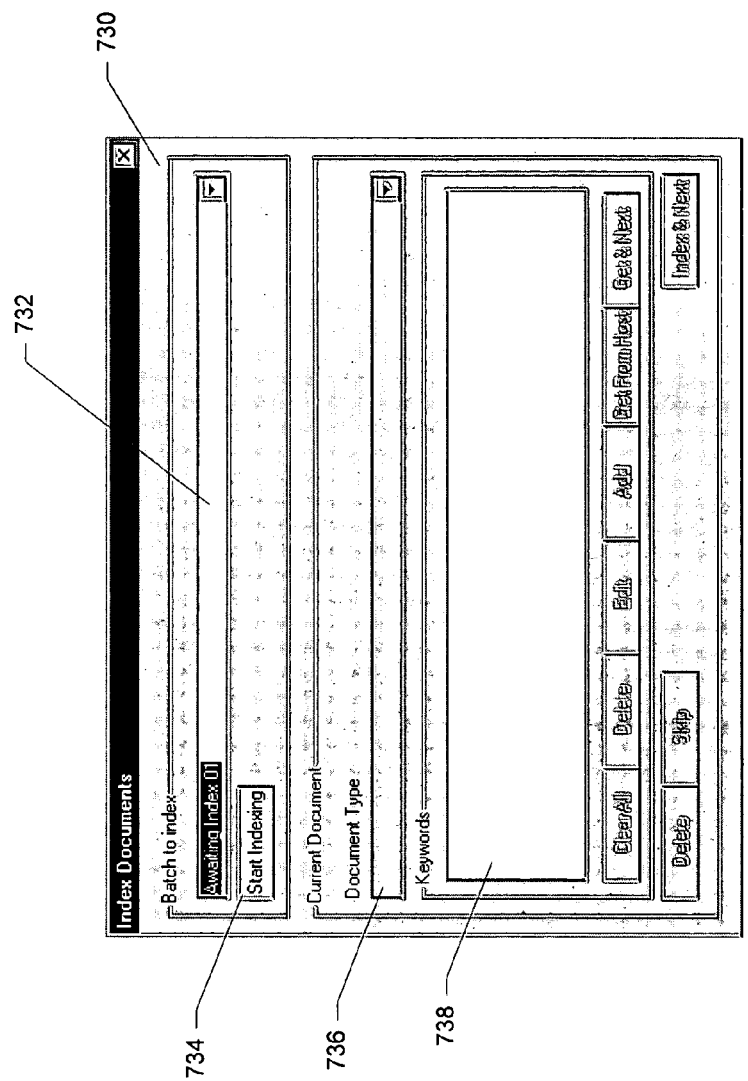
FIG. 29 is a graphical user interface used for document indexing.
Figure 30:
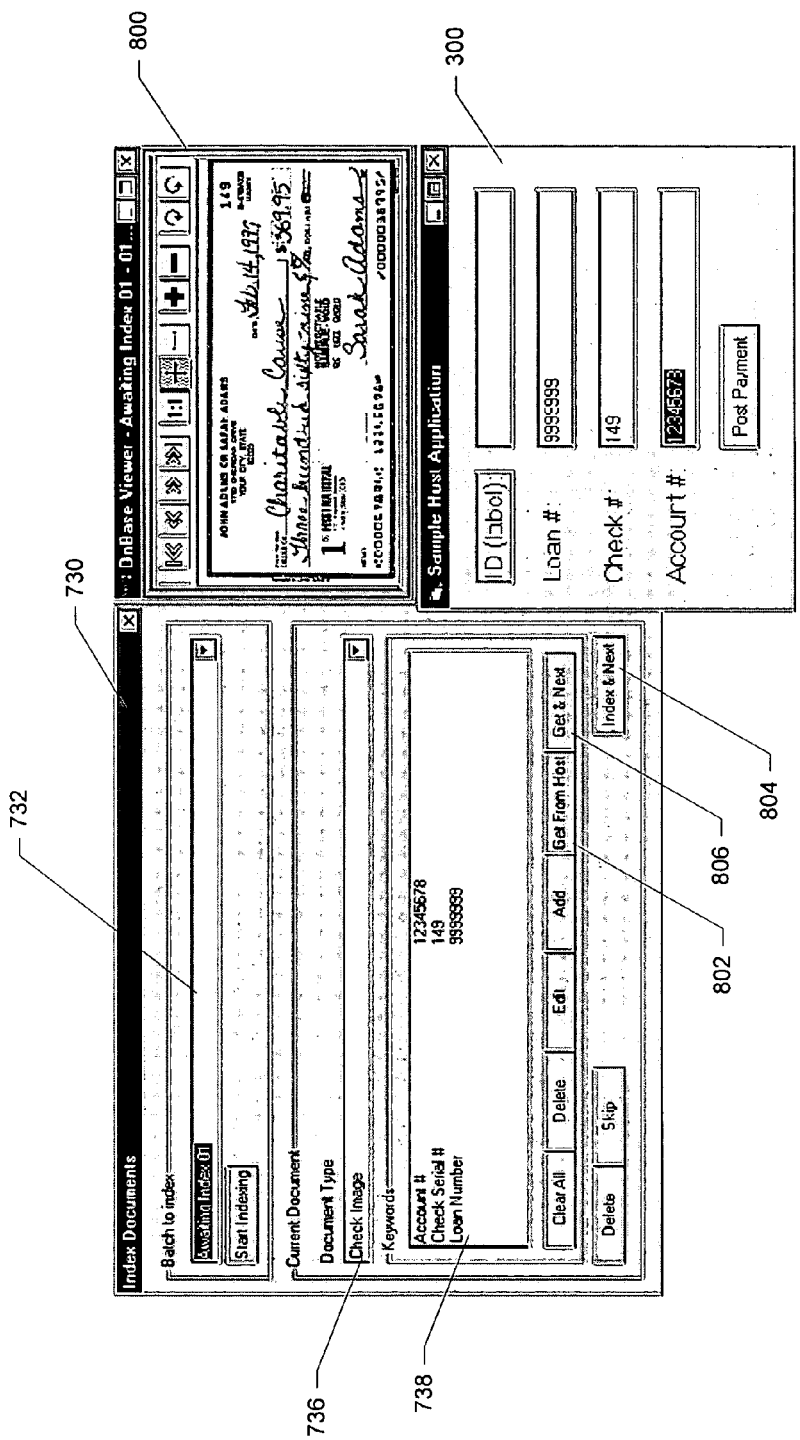
FIG. 30 shows a set of graphical user interfaces that illustrate the scraping of screen values.

FIGS. 29 and 30 illustrate an indexing operational example. Indexing is a process to assign keyword values to documents. The indexing functionality allows a user to index document management system documents directly from the host application, thereby eliminating the need to key index information into the document management system. After indexing, the documents are transferred to a document type specified by the user.

The Index Documents dialog interface 730 is shown in FIG. 29. A user selects the document type that contains the documents to be indexed from the Batch to index via the drop-down list 732. A user clicks the Start Indexing button 734. In the Current Document-Document Type field 736, a user enters the document type to which documents are transferred after indexing. Keyword types and values appear within region 738 after they have been screen scraped.

After the Start Indexing button 734 is activated, the first document to be indexed is displayed in a separate viewer window. A user resizes or moves the window so that the viewer 800, the Index Documents window 730, and the host application 300 are visible as shown in FIG. 30. A user navigates to the host screen 300 that contains keyword information and enters index values into the host application. A user clicks the Get From Host button 802 and activates the host application 300. The keyword types and values are copied to the Keywords list pane 738. The following are exemplary options available for the indexing operations:

Clear All—Clears all index values currently in the Keywords list.

Delete—Deletes a selected index value from the Keywords list.

Edit—Allows a user to change a selected keyword type and/or keyword type.

Add—Adds an additional index value. A user is prompted for the keyword type and keyword value to add.

Get From Host—Prepares the application enabler system to screen scrape values. A user clicks on Get From Host and double-clicks on the open host application. The Keyword types and values appear in the Keyword list for review and editing.

Get & Next—Prepares the application enabler system to screen scrape values. A user clicks on Get & Next and double-clicks on the open host application. The Keyword types and values are automatically accepted. The document is indexed and the next document is retrieved.

Delete—Deletes a selected index value.

Skip—Skips the current document. The open document is not indexed and the next document to index is displayed in the viewer.

Index & Next—Stores the index value and opens the next document to index.

FIGS. 31-35 provide additional operational details associated with the application enabler system. More specifically, FIG. 31 illustrates the operational flow for the Windows-based interrogation process 110 of FIG. 1. With reference to FIG. 31, step one of the operational flow involves loading a program (e.g., a small Application EnablerHook dynamic linked library (DLL) 912) in shared memory. The DLL 912 installs an application-defined hook procedure into the Windows hook chain by calling a Windows API called SetWindowsHookEx. The Application EnablerHook DLL 912 receives a copy of both mouse and keyword input messages sent to every application (e.g., 910, 914, 916) on the system.

Step two of the operational flow involves detecting mouse or keyboard events. Once the Application EnablerHook DLL 912 receives a mouse event from the operating system as determined by decision blocks 920 and 922, the DLL 912 verifies whether the mouse event needs to be processed. If it does not, then the input event is discarded at process block 930. However if the mouse event needs to be processed, then at process block 924 the DLL 912 gathers information about the target window, using the window handle and hot spot location provided by the operating system. If hot spots are not configured, documents are retrieved based on the value of all fields configured for the screen.

As an example of the type of processing involving hot spots, a child window under a hot spot is gathered. The ChildWindowFromPoint Windows API call determines which, if any, of the child windows belonging to the target window contains the specified point. This child window now becomes the target window. The DLL may gather if so configured hot spot location in coordinates relative to the target window. The ScreenToClient Windows API call converts the screen coordinates of the hot spot point on the screen to target window coordinates. The DLL also gathers command line information of the host application process. The GetCommandLine Windows API call retrieves the command-line string for the host application process.

Step three of the operational flow involves whether the input involves a keyboard event. Once the Application EnablerHook DLL receives a keyboard event from the operating system, it verifies whether the message needs to be processed as determined by decision blocks 926 and 928. If it does not, then the input event is discarded at process block 930. However if the keyboard event needs to be processed, then at process block 924 the DLL 912 gathers information about the input focus window. The GetFocus Windows API call retrieves the handle to the window that has the keyboard focus, if the window is attached to the calling thread's message queue. The caret position may be obtained through the GetCaretPos Windows API call which provides a copy of the caret's position. The keyboard state may also be obtained. The GetKeyState Windows API call is used to retrieve the status of the shift, control, and alt virtual keys. The status specifies whether the key is up, down, or toggled. Other information may include pressed key information and command line information. The operating system supplies the virtual key of the pressed key on the callback hook procedure. The GetCommandLine Windows API call retrieves the command-line string for the host application process.

After the input event is processed, step four of the operational flow is performed wherein the Application EnablerHook DLL 912 posts at process block 924 a message in the application enabler system message queue by using the Windows API call PostMessage. This message notifies the application enabler system that a new input message is ready to be retrieved.

FIG. 32 provides additional details of the input event and scrape event operations of process block 112 on FIG. 1. With reference to FIG. 32, after the application enabler system's engine receives an input event notification from the application enabler DLL, process block 1000 obtains event information from the application enabler hook DLL. Process block 1002 finds the application whose module name matches the one contained in the event information provided by process block 1000.

Decision block 1004 examines whether the target application was found. If the target application was found, then decision block 1006 examines whether the input event was a mouse event. If it is a mouse event, then decision block 1008 examines whether the mouse event was expected by the target application and if it was, then the screen values are processed. If the screen is a Windows-based screen, then process block 1010 would process the screen, so as to among other things, load keywords identified on the screen. If the screen is a text-based screen, then process block 1016 would process the screen, so as to among other things load keywords identified on the screen. After the screens have been processed, then decision block 1018 examines whether the screens were processed successfully. If they were, then process block 1020 fires the scrape event via COM (component object model) connection points. After process block 1020 has completed execution, then processing terminates at the end block 1022.

With reference back to decision block 1006, if the input event was not a mouse event, then decision block 1012 examines whether the input event was a keyboard event. If it was not, then processing terminates at block 1022. However, if the input event was a keyboard event as determined by decision block 1012, then decision block 1014 examines whether the keyboard event was expected by the target application. If it was not expected, then processing terminates at block 1022. If the keyboard event was expected by the target application as determined by decision block 1014, then the screens are processed by process blocks 1010 or 1016 in the manner described above. It is noted that decision block 1014 would also have been executed if decision block 1008 had determined that a mouse event was not expected by the target application.

Figure 33B:
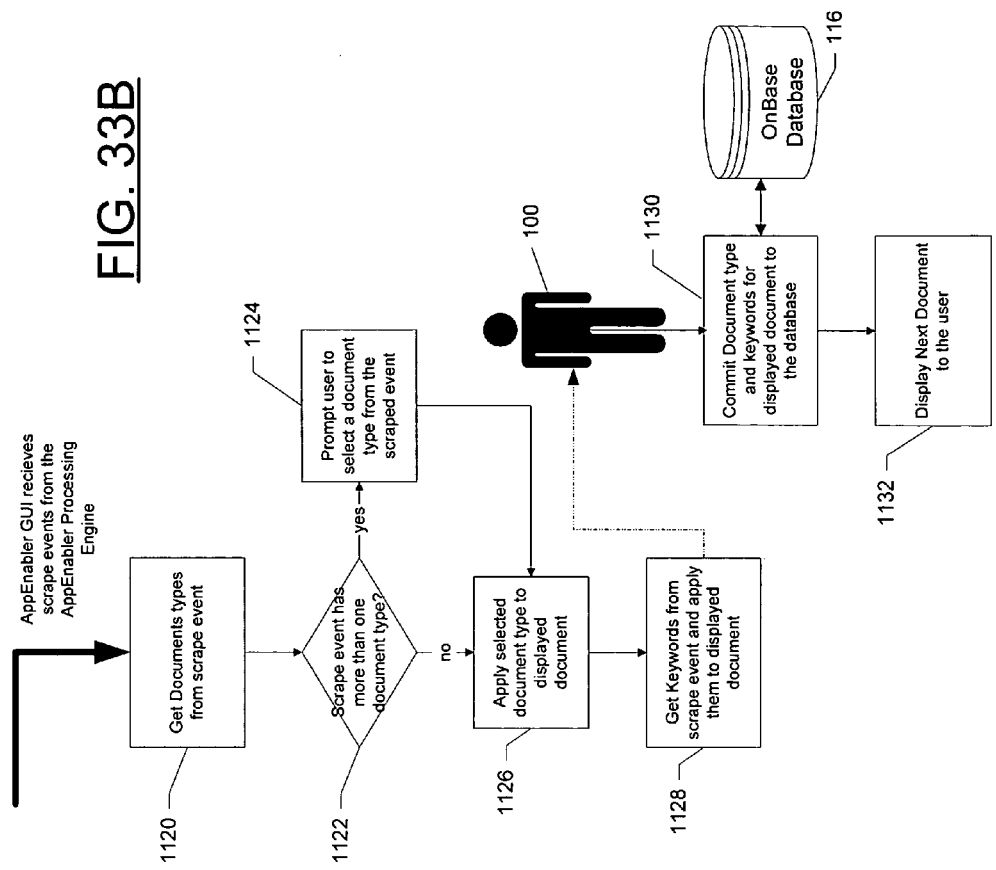
FIG. 33B is a flowchart depicting an indexing operational flow.
Figure 33A:
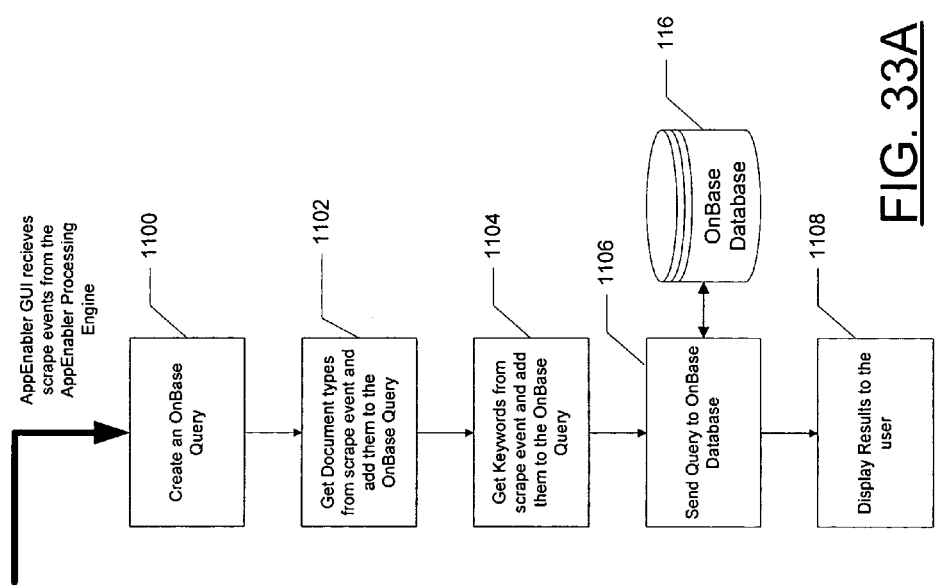
FIG. 33A is a flowchart depicting a retrieval operational flow.

FIG. 33A provides additional details of the retrieval operational flow for process block 114 on FIG. 1. With reference to FIG. 33A, after the application enabler graphical user interface receives scrape events from the application enabler engine, process block 1100 creates a query to be sent to the document management system. In order to create the query, process block 1102 obtains the document types from the scrape event and adds then to the query. Process block 1104 obtains the key words from the scrape event and adds them as well to the query. At process block 1106, the query is sent to the document management system database 116 for execution. The results are displayed to the user at process block 1108.

FIG. 33B provides additional details of the indexing operational flow for process block 120 on FIG. 1. With reference to FIG. 33B, after the application enabler graphical user interface receives scrape events from the application enabler engine, process block 1120 is executed so that the document types may be obtained from the scrape event. Decision block 1122 examines if the scrape event has more than one document type. If it does not, then process block 1126 applies the selected document type to the displayed document. However if decision block 1122 does determine that the scrape event has more than one document type, then the user is prompted to select a document type from the scrape event at process block 1124 before processing continues at process block 1126 which applies the selected document type to the displayed document. Process block 1128 obtains the key words from the scrape event and applies them to the displayed document. At process block 1130, the user 100 optionally reviews and commits the document type and key words for the displayed document to the database 116. At process block 1132, the next document for indexing is displayed to the user 100.

Figure 34B:
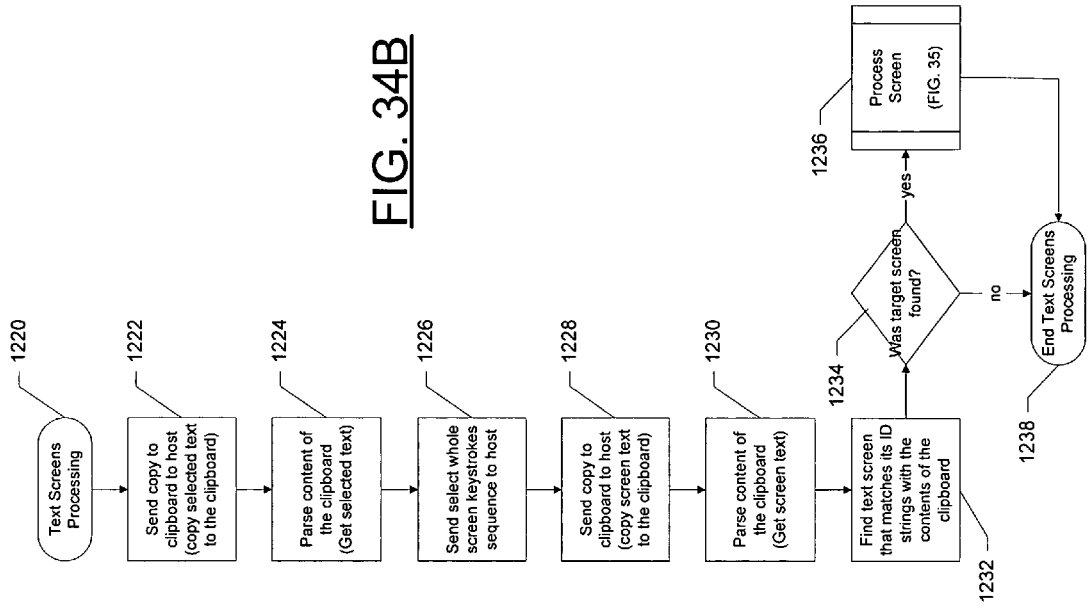
FIG. 34B is a flowchart depicting processing text-based screens.
Figure 34A:
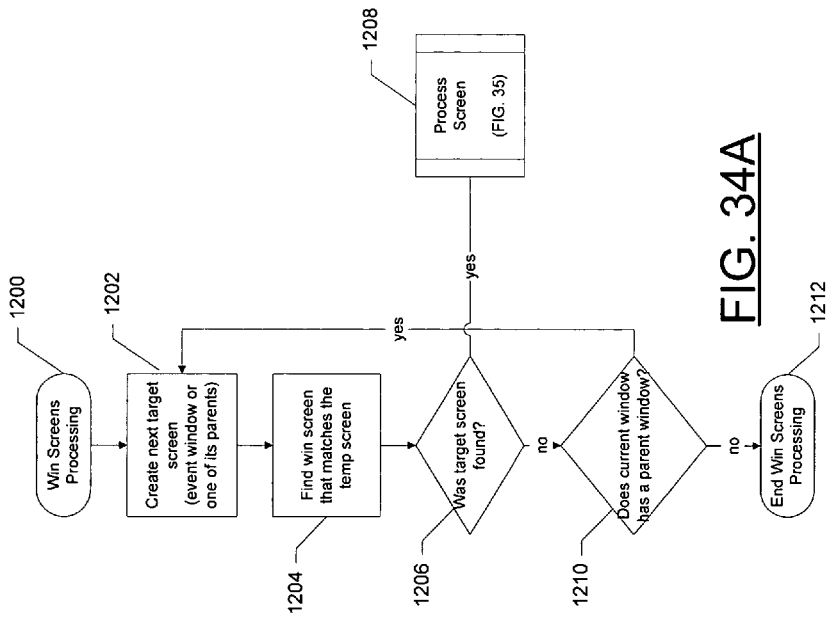
FIG. 34A is a flowchart depicting processing Windows-based screens.

FIG. 34A provides additional details of the Windows-based screen processing operations for process block 310 on FIG. 32. With reference to FIG. 34A, start indication block 1200 indicates that process block 1202 is executed wherein a target screen is created, such as for an event window. Process block 1204 finds the Windows-based screen that matches the temporary screen that has just been created by process block 1202. Decision block 1206 examines whether the target screen was found. If it was, then the screen is processed at process block 1208 (whose operations are further described in FIG. 35). However, if the target screen was not found as determined by decision block 1206, then decision block 1210 examines whether the current window has a parent window. If it does not, then processing terminates at end block 1212. If decision block 1210 does determine that the current window has a parent window, then processing resumes at process block 1202 wherein the next target screen is created for the parent window.

FIG. 34B provides additional details of the text-based screen processing operations for process block 316 on FIG. 32. With reference to FIG. 34B, start indication block 1220 indicates that process block 1222 is executed wherein a copy of what has been selected for the text-based screen is sent to the host application. Process block 1224 parses the content of the clipboard in order to obtain the selected text. Process block 1226 sends the selected whole screen keystroke sequence to the host application. At process block 1228, the portion that was copied to the clipboard is sent to the host. Process block 1230 parses the content of the clipboard in order to obtain the screen text.

At process block 1232, the text screen is found that matches its identification screens through use of the contents of the clipboard. Decision block 1234 examines whether the target screen was located via process block 1232. If it was, then the screen is processed at process block 1236 (whose operations are further described in FIG. 35). If the target screen was not located as determined by decision block 1234, then processing for this routine ends at end block 1238.

Figure 35:
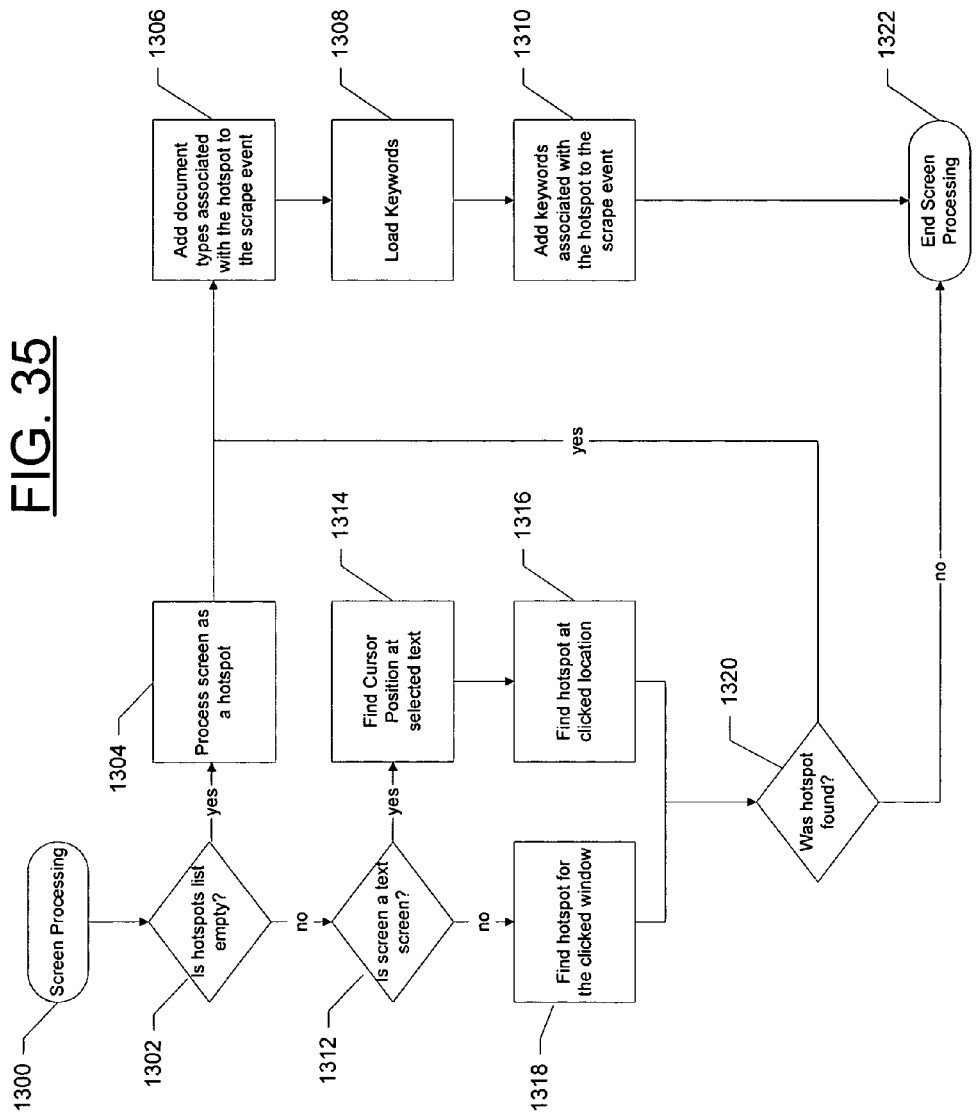
FIG. 35 is a flowchart depicting processing hot spots for screens.

FIG. 35 provides additional details of the screen processing operations for process block 1208 on FIG. 34A and process block 1236 on FIG. 34B. With reference to FIG. 35, start indication block 1300 indicates that decision block 1302 examines whether the list of hot spots is empty. If it is empty, then process block 1304 processes the screen as a hot spot. Processing then continues at process block 1306. However, if the hot spots list is not empty as determined by decision block 1302, then decision block 1312 examines whether the screen is a text-based screen. If it is, then process block 1314 locates the cursor position at the selected text before process block 1316 locates the hot spot at the click location.

If decision block 1312 determines that the screen is not a text-based screen, then process block 1318 finds the hot spot for the correct window. Decision block 1320 examines whether a hot spot was located. If it was not, then processing for this routine terminates at end block 1322. However, if a hot spot was found at decision block 1320, then process block 1306 adds the document type associated with the hot spot to the scrape event. Process block 1308 loads the key words, and process block 1310 adds the key words associated with the hot spot to the scrape event. Processing for this routine terminates at end block 1322.

While examples have been used to disclose the invention, including the best mode, and also to enable any person skilled in the art to make and use the invention, the patentable scope of the invention is defined by the claims, and may include other examples that occur to those skilled in the art. As an example of the wide range and scope of the system and method, the application enabler system and method allow users to access data across the departmental boundaries imposed by separate line-of-business applications. Since the document management system is used as a central document repository, departments can share documents, regardless of the system they are using. For example, multiple systems can be enabled to access document management system documents from separate applications, allowing (for example) the Accounting department to access documents from a frequently used accounting application and the Human Resources department to access the same documents through a different application.

The system and method provide a seamless integration between an organization's core applications and a document management system. The system and method improve employee efficiency by allowing users to retrieve supporting documents—including images, application files, and text reports—by clicking on a specified field within a program such as an ERP, CRM, or other line-of-business application. An additional benefit is that multiple departments can share information regardless of their respective core applications, thus maximizing the organization's investment in these separate line-of-business applications. The integration between other applications and a document management system is done without the time and costs associated with custom programming—traditionally required for interaction between applications. API's (application programming interface) are not required for integration, and configuration is a point and click process. The system and method remove the need to learn new API's, to determine compatibility, and to do the programming. The system and method may also include security features, such as using login user name and passwords to restrict or allow access to the data stored in the document management system.

Figure 36:
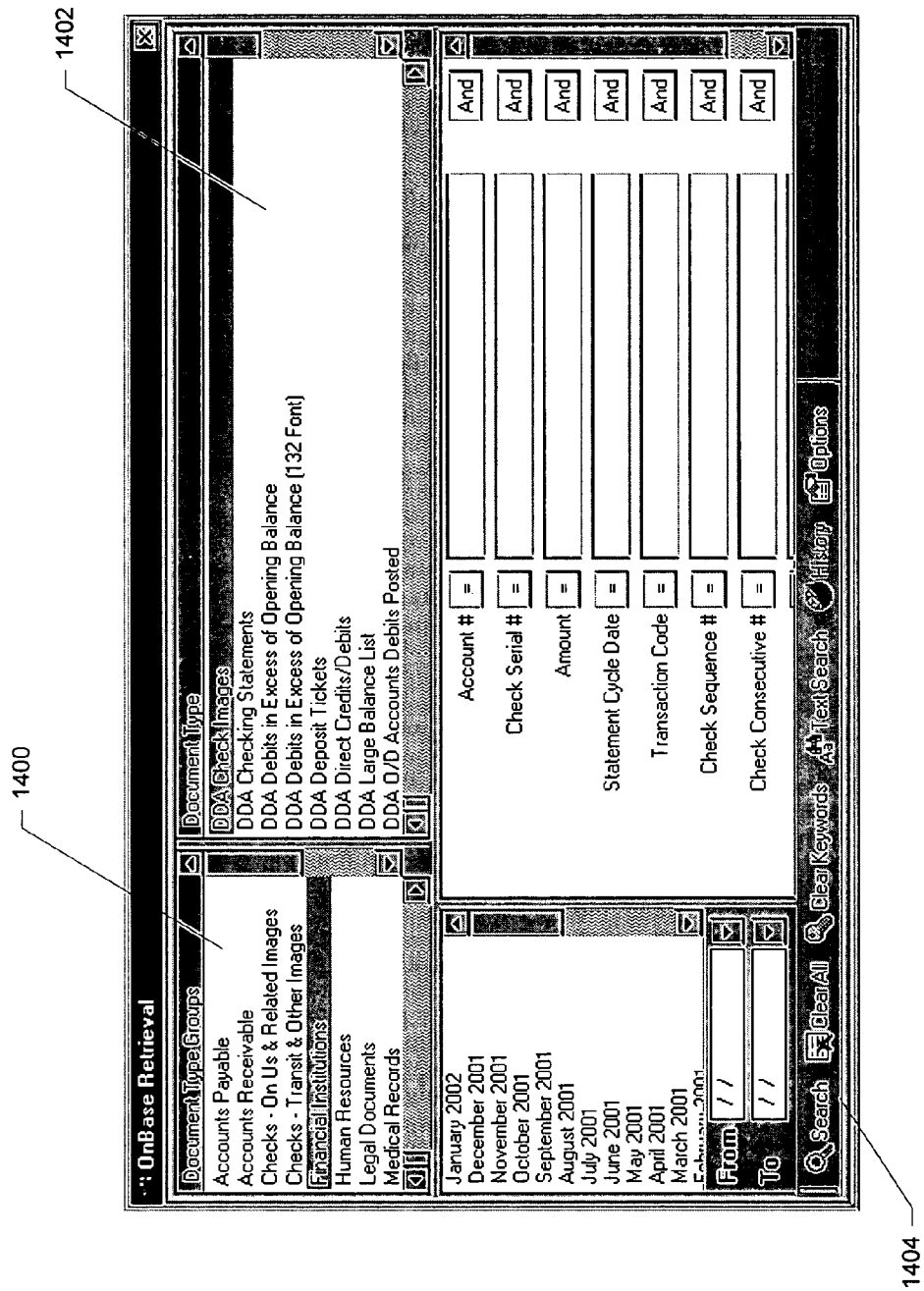
FIG. 36 is a graphical user interface for illustrating the retrieval of image documents.

As another example of the wide scope and range of the system and method, the system and method may be practiced on document management systems that contain such document searching capability as shown in FIG. 36. To find a text or image document, a user selects a Document Type Group within region 1400 and/or Document Types(s) 1402 and clicks the Search button 1404. A user can limit the search based by one or more of the following: Document Type Groups; Document Types; Document Date; Common Keywords; Document Types.

Each document that is brought into the document management system is assigned to a Document Type. Document types group together documents with similar characteristics.

For example, a document type of AP—PACKING SLIPS might be used to define image files of packing slips. Document types allow a user to work with groups of documents rather than individual documents. For example, a user can limit document searches to only those documents of a certain document type.

Documents types can be further organized into Document Type Groups, a unit that groups together similar document types. For example, the document types Health Records and Insurance Documents can be grouped together under the document type group Patient Information.

A user can select one document type at a time from the Document Types list. The number of documents that are found is limited to those belonging to the document type that a user selects. When a document type is selected, the keyword types for that document type will appear in the Keywords section.

In some cases, a user can search over an entire document type group, without limiting the search by document type. If the document type group has been configured as "group search enabled" the Search button is active when only a document type group is selected (no document type is selected). The search will return documents from all document types within the document type group.

The user clicks the Search button 1404 to view the list of documents that are part of the document type group. The Dates section allows a user to define a specific date or range of dates to search for documents. The user specifies the desired months from the Date list. A user can select a date range by selecting the From date, holding down the Shift key, and selecting the To date. The dates are automatically filled into the From and To fields. The user clicks on the arrow next to the From and To date boxes to select the date from a popup calendar.

Once a user has selected a document type group or document type(s), the documents' common keyword type fields appear in the Keywords section. For example, if a user selects two document types, one with keyword types of Customer Name and Account #, and the other with Customer Name and Address, only the Customer Name keyword type field appears in the Keywords section below.

To further limit the search, a user may enter specific keyword values for which to search. If a user does not enter keyword values, the system returns documents regardless of the keyword values associated with the documents.

Advanced Keyword Features allow a user to narrow the document search from the Document Retrieval dialog box. Advanced Keyword Features include comparative operators, logical operators, and wild cards. Comparative operators allow a user to retrieve documents based on a range of keyword values, as well as exact keyword value matches.

Figure 37:
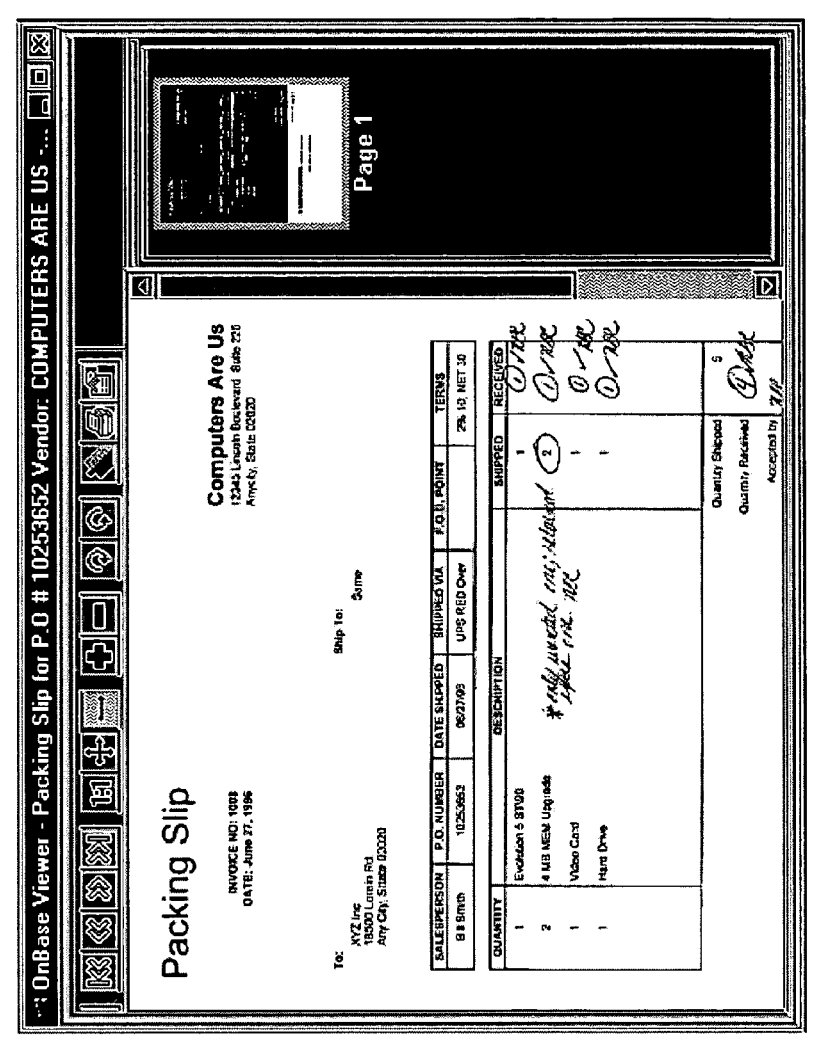

It is noted that image documents are graphic representations of information, such as images of checks used by financial institutions or pictures of houses stored by real estate agents or loan officers. To open an image document, a user performs a document search and selects the desired document in the Documents search results list. Image documents are displayed in an image-viewing window like the one shown in FIG. 37. The image-viewing window provides sizing and navigation options via the Image Viewer Control toolbar and the Thumbnail window. The Image Viewer Control toolbar is displayed at the top of the document and provides viewing options such as page navigation, sizing and rotation options, overlay viewing, and printing.

Figure 38:
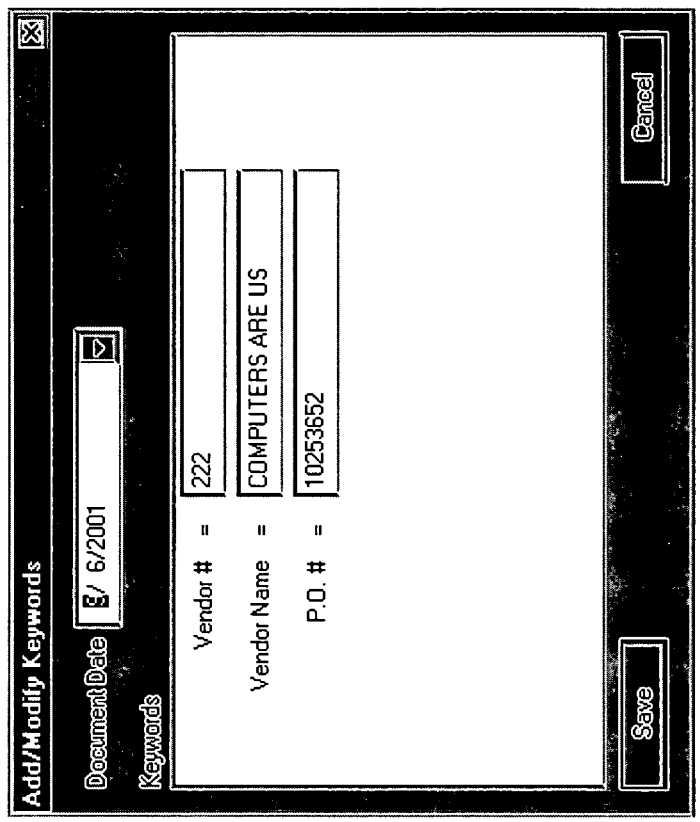
FIG. 38 is a graphical user interface for adding or modifying key words.

A user can also modify the keywords associated with an image document by selecting Keywords to display the Add/Modify keywords dialog box as illustrated in FIG. 38. A user changes the keyword values and/or document date as desired and clicks Save to associate the new values with the document.

Figure 39A:
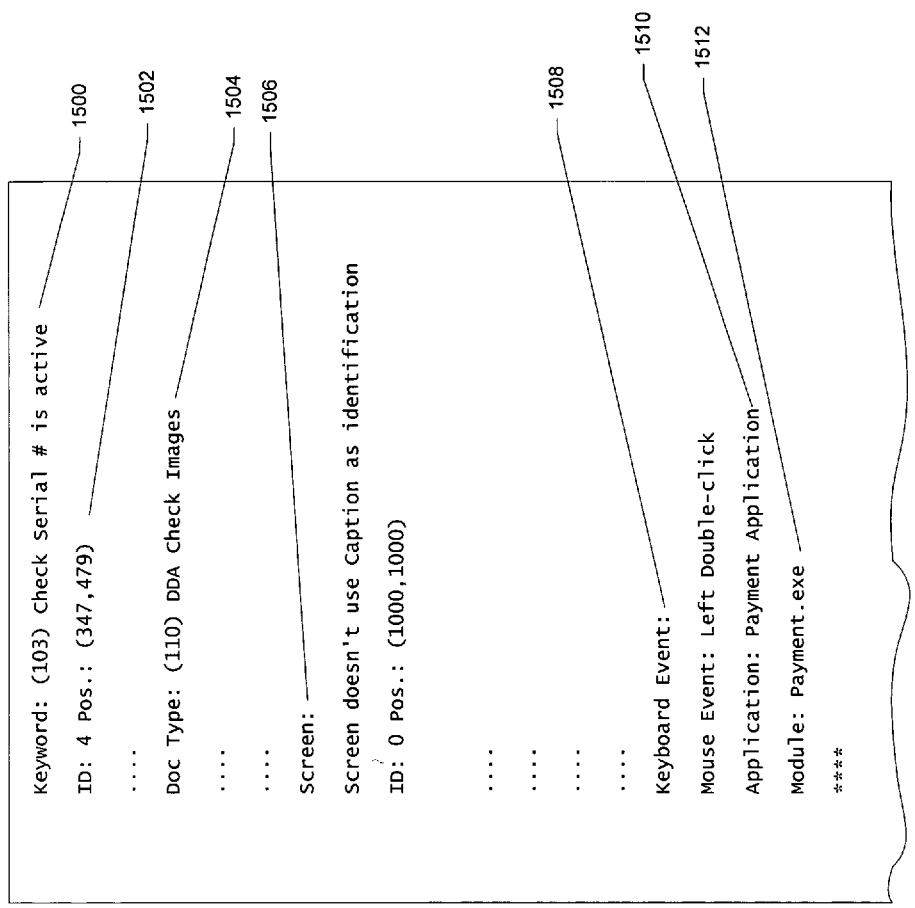
FIGS. 39A and 39B illustrate a verbose report.
Figure 39B:
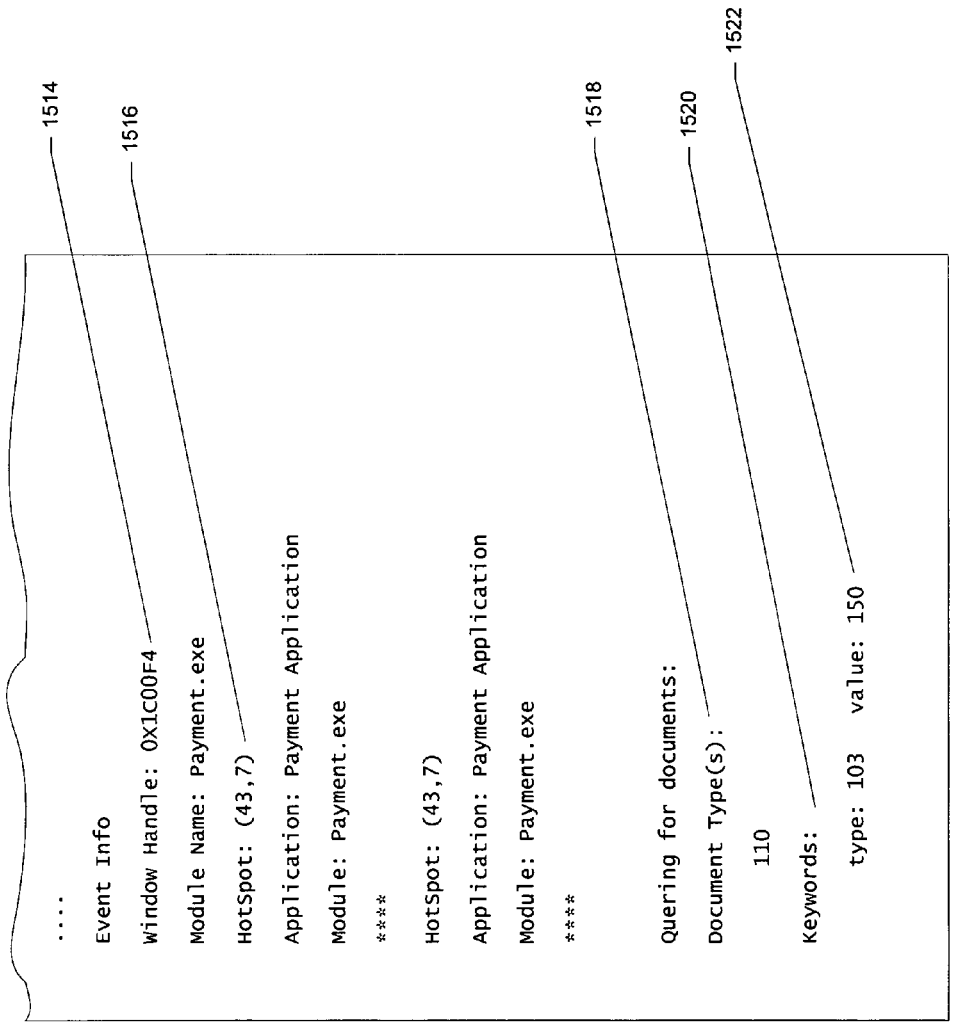

With reference to FIGS. 39A and 39B, a user may also run the application enabler system with the V switch which enables the verbose mode. When running in verbose mode, the application enabler system logs configuration information to a file. This configuration information can be helpful during troubleshooting. FIGS. 39A and 39B shows an example of the type of information found in a verbose log:

At reference number 1500 is an example of a configured keyword by number and name.

At reference number 1502 is an example of a control.

At reference number 1504 is an example of a document type to be retrieved.

At reference number 1506 is displayed an example of screen information.

At reference number 1508 is an example of keyboard and mouse events that trigger document searching.

At reference number 1510 is an example of a user-defined application name.

At reference number 1512 is an example of an application name recognized by the application enabler system.

At reference number 1514 is an example of a Window API ID for the enabled window.

At reference number 1516 is an example of a hot spot location that a user may click upon.

At reference number 1518 is an example of a document type to be queried.

At reference number 1520 is an example of a keyword type limiting query.

At reference number 1522 is an example of a keyword value.

As yet another example of the many applications and extensions of the system, the applications may use controls that are active, such as ActiveX® Edit controls that communicate to the windows API. Text-based applications may use standard copy-to-clipboard functionality, keyword values that are in the same position on the screen, and Windows API.

Figure 40:
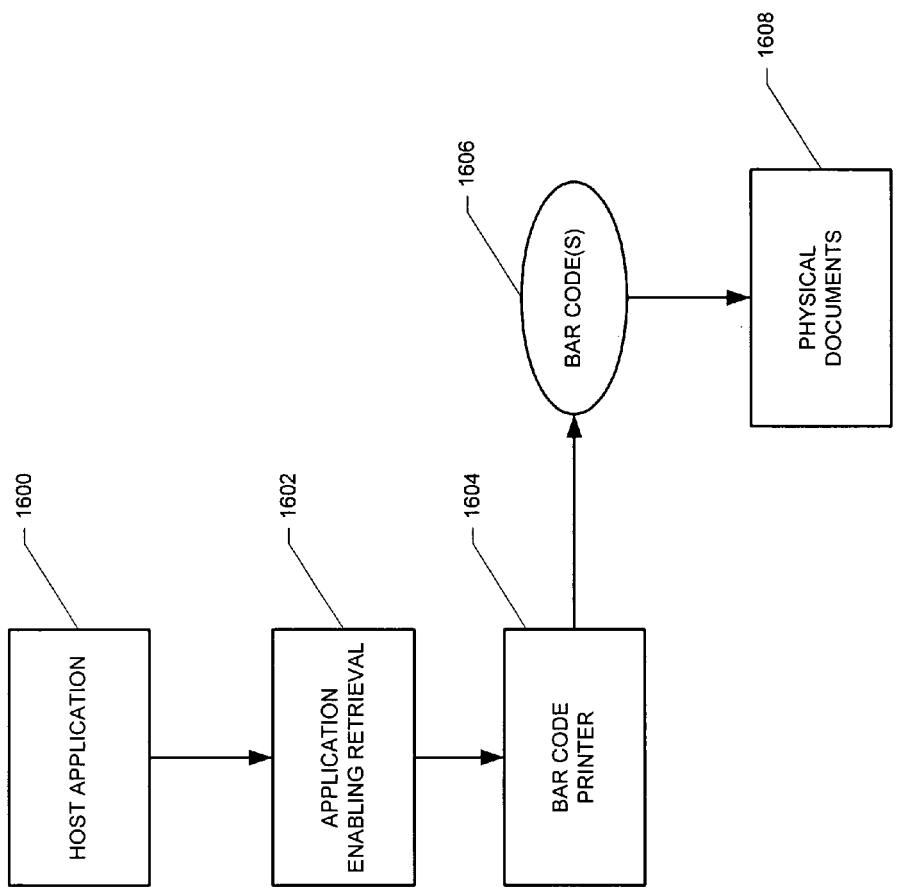
FIGS. 40-44 are block diagrams depicting systems that interface with an application enabling retrieval process.

As shown in FIG. 40, the systems and methods may be used to generate barcodes 1606 or other identification labeling for physical documents 1608. Application enabling retrieval functionality 1602 scrapes or retrieves values from a host application 1600 and provides the values so that a bar code printer 1604 can generate a bar code or a sheet of bar codes 1606.

The generated bar codes 1606 can then be used to identify one or more physical documents 1608. Via the generated bar codes 1606, the systems and methods may be configured to allow the input of these physical documents 1608 into the document management system to be automated without requiring any (or a substantial amount) of data entry because the data entry will be pre-applied as bar codes.

Figure 41:
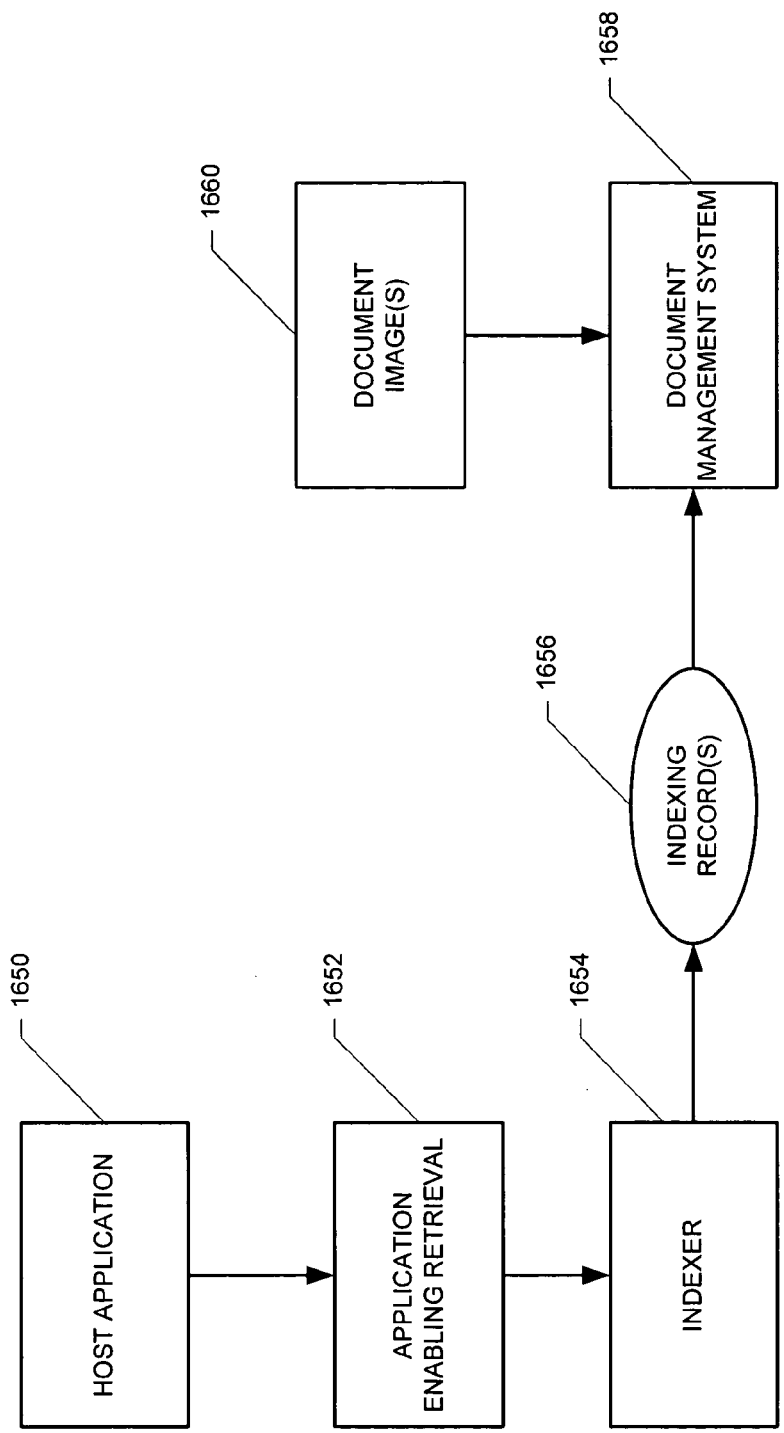

As shown in FIG. 41, the systems and methods may be used to index documents. Application enabling retrieval functionality 1652 scrapes or retrieves values from a host application 1650 and provides the values to a software application 1654 that can generate indexing records 1656 for use within a document management system 1658. The indexing records 1656 can help automate the importation of documents 1660 into the document management system 1658 since the indexing records 1656 will have already been created prior to the documents 1660 being available for importation into the document management system 1658.

The application enabling retrieval functionality 1652 can operate with a time delay—that is, the indexing records 1656 can be created at a later time and used as data entries in the document management system 1658 for when the documents 1660 actually arrive and are ready for processing by the document management system 1658. Through pre-indexing, a placeholder is created in the database for which a document that is to be scanned or otherwise placed into the document management system 1658 will utilize.

As an illustration, application enabling retrieval operations can scrape values from a hospital admission host application and store the values as a record in a relational data base in anticipation of a document being scanned and placed into the document management system. During the hospital patient registration process, a user inputs patient admission data (e.g., name, address, phone number, employer, insurance company, etc.) into the host application whose values are scraped and used to create a document indexing data record in the database. The document corresponding to the indexing record is made available at a later time and is then matched up with the already existing indexing record in the database. The matching can be done in many different ways. For example, the document management system can show a hospital worker the data records that have already been created and for which a document needs to be associated. The hospital worker can select the data record at the time that they are going to scan or otherwise enter the document into the document management system. The available data records may be sorted by patient name or other record identification data. The hospital worker clicks on the patient's name, and all the fields are automatically populated. The hospital worker then places the paper in the scanner and activates the scan button. Such an approach can remove the need for a workstation to have a keyboard since the hospital worker will be selecting from pre-existing data records on a screen. As another example, a hospital worker can bring up the appropriate pre-existing data record for the document using a single unique value.

Figure 42:
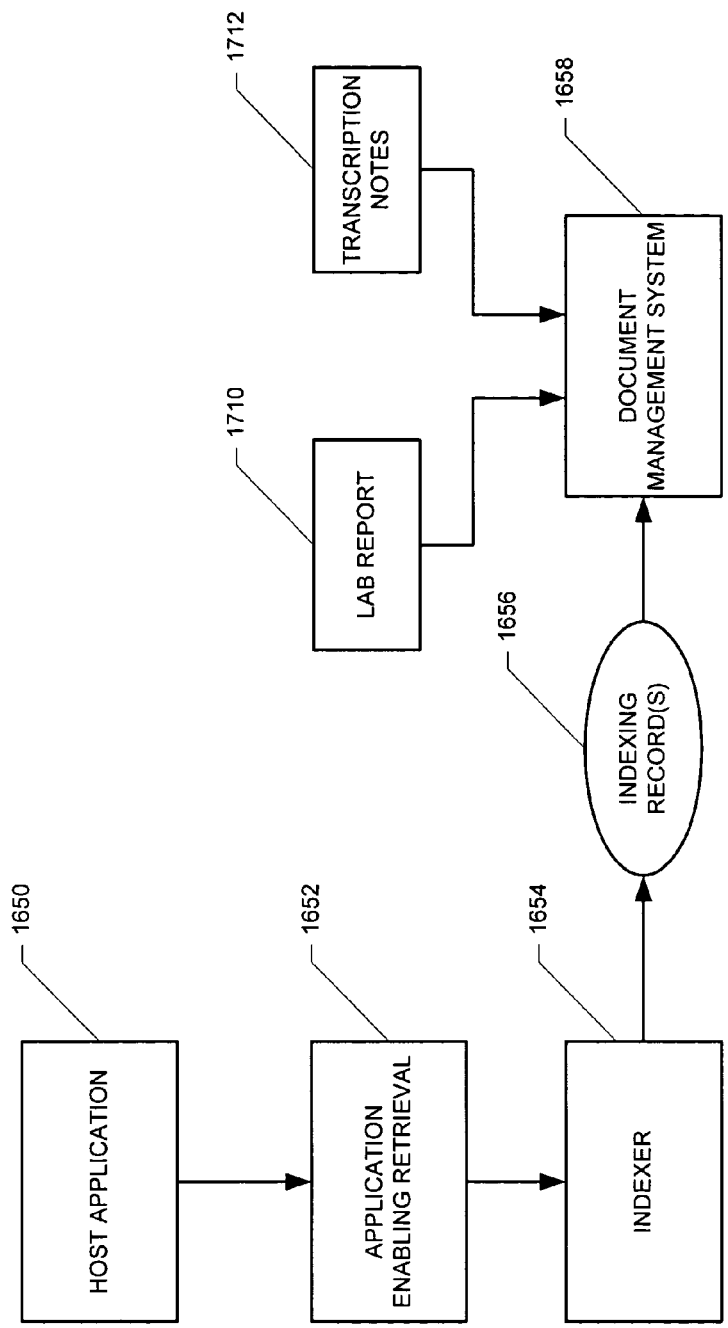

FIG. 42 illustrates another example wherein if a prescription is later required for that patient, a hospital worker can scan in the prescription and by applying the patient number, the worker can automatically attach the patient's demographic information contained in the record to that document. Later on, another worker can be generating an ad hoc lab report 1710 or storing transcription notes 1712 of the patient's X-ray, and the already created document indexes 1656 can be used to store the lab report 1710 or transcription notes 1712. Thus, application enabling operations may create a data record for generic use for any new document that is generated (whether unplanned/impromptu/ad hoc or otherwise) for a patient. The new document may not be any specifically expected document, but allows for performing a relatively quick and efficient indexing and data population for documents that exist later in the process (e.g., created during the patient's stay in the hospital) and are scanned into a document management system. There can be a one-to-many relationship in that an indexing record may be used for multiple documents that may arise later in time.

As illustrated in these examples, application enabling retrieval operations can result in data records that precede the existence of the document, thereby creating a cost-effective way of doing scanning and indexing. Moreover, because data records for documents are generated in this manner, fresher/more recent data can be used when storing documents instead of potentially stale data resulting from a static dump from a mainframe system.

Figure 43:
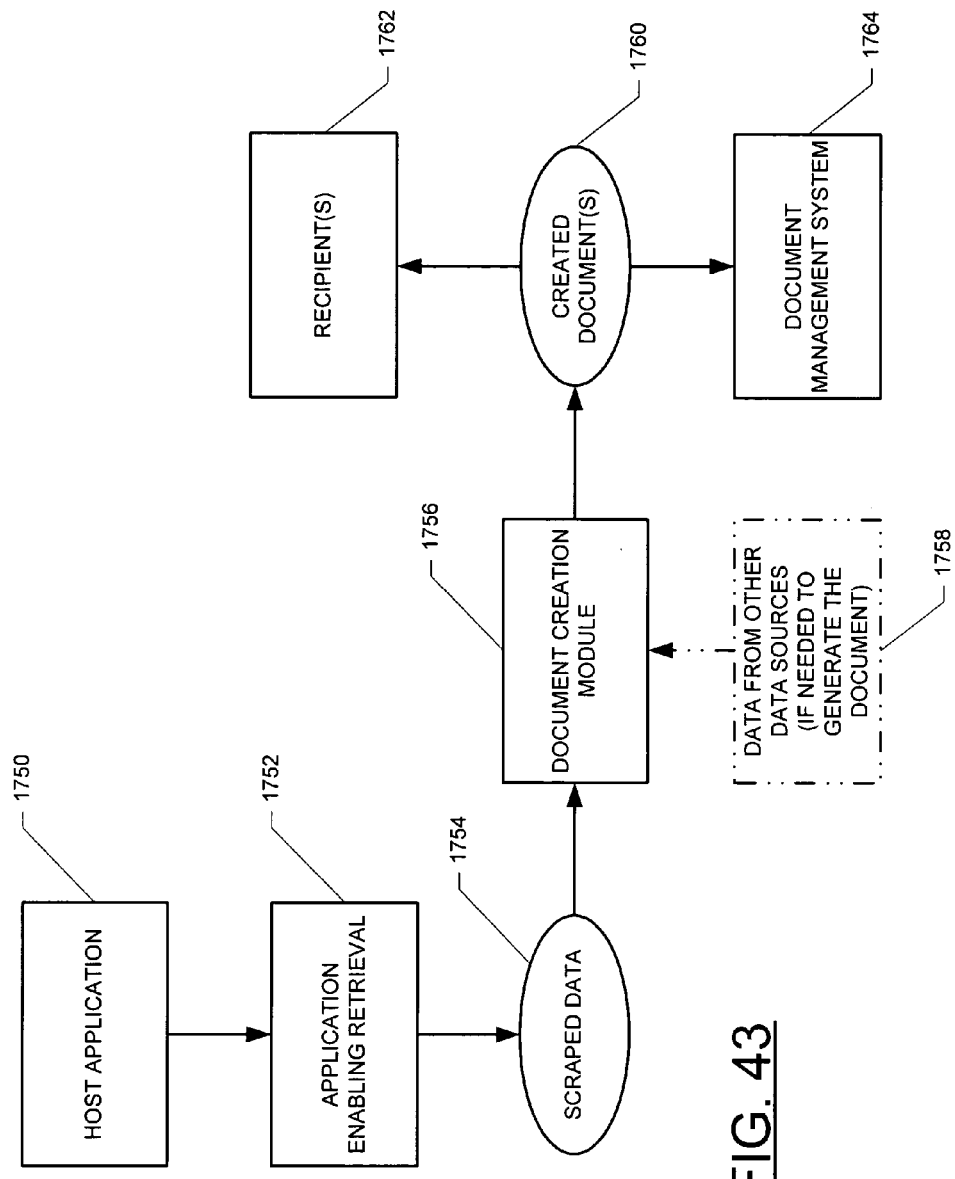

As shown in FIG. 43, application enabling retrieval operations 1752 may scrape or retrieve values from a host application 1750. A software module 1756 creates one or more documents 1760 using the scraped values 1754. The created document 1760 can be routed to one or more recipients 1762 as well as stored in the document management system 1764.

For example, scraped information from a pre-surgery patient admission host application can generate a new document to be routed automatically (either electronically or in a hardcopy format) to a dietician. The routed document can contain a menu selection of meal items that the patient is going to eat when they are in the hospital.

In addition to the scraped information 1754 (e.g., patient name, etc.), 1758 data other than what was obtained via the host application 1750 can be used in generating the document 1760, such as the dietician's e-mail address and phone number. This data can be retrieved from a local or remote database. The scraped data 1754 and any other required data 1758 are then used to populate a document 1760 for the dietician that contains certain blanks for completion by the dietician. The blanks could contain places for entry of information about dietary restrictions that the patient may have.

Figure 44:
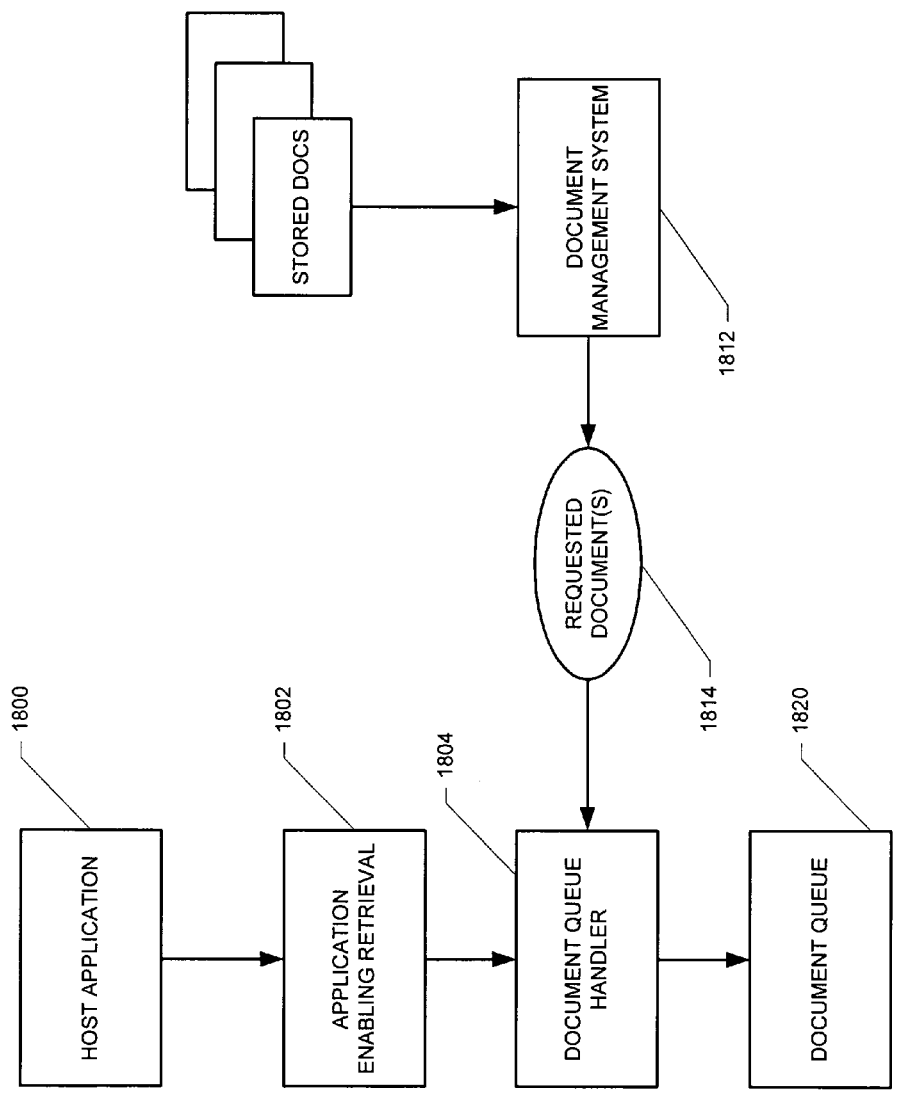

As shown in FIG. 44, the systems and methods may be used to queue up documents. Application enabling retrieval functionality 1802 scrapes or retrieves data from a host application 1800 and provides the values to a software application 1804. The software application 1804 can use the scraped identifier(s) to retrieve a corresponding document 1814 from the document management system 1812 if the document is not already available to the software application 1804. The software application 1804 places the identified documents into a location 1820 for later access by a user.

The location 1820 can be a temporary storage location, such as a queue, that can provide the queued documents upon request. A user can request that the queued documents be retrieved at a later point in time from the queue so that they can be reviewed. The reviewing user can be a different person than the person originally involved in interacting with the host application when the data was scraped. For example, document identifiers scraped from a first person's interaction with a host application can be used to place the corresponding documents into a queue. A second person can then review the documents in the queue at a later point in time.

The queue can also be used for other purposes. As an illustration, document identifiers scraped from a user's interaction with a host application can be used to place the corresponding documents into a queue. The documents in the queue can later be moved to a network location or to a removable computer medium (e.g., CD) so that the person can later review the documents such as at home.

As another example, a first person is examining invoices through multiple invoice screens and observes that these invoices have high dollar items. Later on, the first person wishes to have someone else review all of those items. Application enabling retrieval operations retrieve the document identifiers from the screens viewed by the first person. The software application queues all the corresponding documents so that they can be retrieved at a later point in time. As an illustration, these documents could also be queued for use in tomorrow's work by either or both of the first and second persons.

It is claimed:

1. A computer-implemented method for enabling a host application to retrieve document images of a plurality of physical documents stored in a document management system through an enabler application that is used for creating an association between at least one field on an interface of the host application and at least one field of the document management system, the method comprising steps of:

(a) executing the enabler application and the host application by an execution application;

(b) displaying the interface of the host application while the host application is executing during run-time, wherein the interface of the host application contains the at least one field; and (c) while the interface is being displayed, creating an association using the enabler application between the at least one field on the interface of the host application and the at least one field of the document management system that is used for retrieving the document images from the document management system, wherein the association identifies the at least one field on the interface based upon a position of the at least one field on the interface, (d) in response to receiving an indication at the enabler application that the at least one field on the interface is an interactive field, when a user performs an interaction with the interactive field, a query is immediately performed based on existing data in the interactive field, and any document images retrieved from the document management system are displayed based on the performed interaction;

wherein
   data provided for the at least one field on the interface of the host application during the execution of the host application is captured based upon the position of the at least one field on the interface, and wherein the data captured from the at least one field is used to generate bar codes based upon the created association;

the generated bar codes are associated with one or more physical documents for automating input of the one or more physical documents into the document management system;

the bar codes are generated before the one or more physical documents exist;

an indexing process is performed from the executing application, wherein the indexing process assigns an index record including keyword values to corresponding physical documents from the data provided to the interface, during the indexing process, the user matches data currently displayed on the interface of the host application with a particular physical document to be indexed in the document management system to eliminate needs to re-key index information of the particular physical document in the document management system; and the index record is associated with the plurality of physical documents.

2. The method of claim 1, wherein the document management system handles image files, paper, reports, application files, e-mails, and web contents.

3. The method of claim 1, wherein the at least one field on the interface is identified through a unique window identifier that is assigned to control appearing on the interface, wherein identification of the at least one field on the interface is used to determine whether the data provided to the at least one field is to be used in generating the query for retrieving the document images from the document management system.

4. The method of claim 1, wherein the identification of the at least one field on the interface is used to determine whether the data provided to the at least one field is to be used in generating the query for retrieving the document images from the document management system.

5. The method of claim 1, wherein the at least one field on the interface is identified through an absolute position of the at least one field on the interface, wherein the identification of the at least one field one the interface is used to determine whether the data provided to the at least one field is to be used in generating the query for retrieving the document images from the document management system.

6. The method of claim 1, wherein the at least one field on the interface is identified based upon an order in which operating system and the applications communicate to each other, wherein the identification of the at least one field is used to determine whether the data provided to the at least one field is to be used in generating the query for retrieving the document images from the document management system.

7. The method of claim 1, wherein a retrieval-related attribute used to retrieve the document images comprises a keyword type to be searched when retrieving the document images from the document management system while the enabler and host applications are executing.

8. The method of claim 1, wherein other associations are created between other fields on the interface and retrieval-related attributes, wherein data specified in the other fields on the interface are used to create at least a query that retrieves the document images from the document management system.

9. The method of claim 1, wherein documents images stored in the document management system are retrieved by performing a keyboard event on the host application's field that contains a keyword value.

10. A computer-implemented system for operating within a processor-based environment and enabling a host application to retrieve document images of a plurality of physical documents stored in a document management system through an enabler application that is used for creating an association between at least one field on an interface of the host application and at least one field of the document management system, the system comprising:

a computer processor;

means for executing through the computer processor the enabler application and the host application;

means for displaying through the computer processor the interface of the host application while the host application is executing during run-time, wherein the interface of the host application contains the at least one field;

means for creating through the computer processor an association using the enabler application between the at least one field on the interface of the host application and the at least one field of the document management system that is used for retrieving the document images from the document management system while the interface is being displayed, wherein the association identifies the at least one field one the interface based upon a position of the at least one field on the interface;

wherein
   in response to receiving an indication at the enabler application that the at least one field on the interface is an interactive field, when a user performs an interaction with the interactive field, a query is immediately performed based on existing data in the interactive field, and any document images retrieved from the document management system are displayed based on the performed interaction;

data provided for the at least one field on the interface of the host application during an execution of the host application is captured based upon the position of the at least one field on the interface, and wherein the data captured from the at least one field is used to generate bar codes based upon the created association;

the generated bar codes are associated with one or more physical documents for automating input of the one or more physical documents into the document management system;

the bar codes are generated before the one or more physical documents exist;

an indexing process is performed from the executing application, wherein the indexing process assigns an index record including keyword values to corresponding physical documents from the data provided to the interface;

during the indexing process, the user matches data currently displayed on the interface of the host application with a particular physical document to be indexed in the document management system to eliminate needs to re-key index information of the particular physical document in the document management system; and the index record is associated with the plurality of physical documents.

11. A computer-implemented apparatus for operating within a processor-based environment and for enabling a host application to retrieve document images of a plurality of physical documents stored in a document management system through an enabler application that is used for creating an association between at least one field on an interface of the host application and at least one field of the document management system, comprising:

a non-transitory computer-readable storage medium for storing mapping rules having associations between the at least one field of the host application and the at least one field of the document management system that is used for retrieving the document images from the document management system, wherein the associations are created using the enabler application while the host application is being executed during run-time, wherein a particular association identifies a particular field based upon a position of the particular field on the interface;

an interrogator module that executes on a computer processor and that interacts with an operating system (OS) that is hosting the host application in order to determine whether a preselected interface event has occurred; and an input event processor that executes on the computer processor and that receives interface data from the host application after detection of the interface event by the interrogator module, wherein the interface data is captured based upon the position of the particular field on the interface, wherein the data captured by the apparatus is used to generate bar codes;

wherein in response to receiving an indication at the enabler application that the at least one field on the interface is an interactive field, when a user performs an interaction with the interactive field, a query is immediately performed based on existing data in the interactive field, and any document images retrieved from the document management system are displayed based on the performed interaction;

the generated bar codes are associated with one or more physical documents for automating input of the one or more physical documents into the document management system;

the bar codes are generated before the one or more physical documents exist;

an indexing process is performed from the executing application, wherein the indexing process assigns an index record including keyword values to corresponding physical documents from the data provided to the interface;

during the indexing process, the user matches data currently displayed on the interface of the host application with a particular physical document to be indexed in the document management system to eliminate needs to re-key index information of the particular physical document in the document management system; and the index record is associated with the plurality of physical documents.

12. A system for enabling a host application to retrieve document images of a plurality of physical documents stored in a document management system through an enabler application that is used for creating an association between at least one field on an interface of the host application and at least one field of the document management system, the system comprising:

a computer processor;

a non-transitory processor-readable storage medium containing one or more programming instructions that, when executed, cause the processing system to execute steps comprising:

(a) executing the enabler application and the host application by an execution application;

(b) displaying the interface of the host application while the host application is executing during run-time, wherein the interface of the host application contains the at least one field; and (c) while the interface is being displayed, creating an association using the enabler application between the at least one field on the interface of the host application and the at least one field of the document management system that is used for retrieving the document images from the document management system, wherein the association identifies the at least one field on the interface based upon a position of the at least one field on the interface, (d) in response to receiving an indication at the enabler application that the at least one field on the interface is an interactive field, when a user performs an interaction with the interactive field, a query is immediately performed based on existing data in the interactive field, and any document images retrieved from the document management system are displayed based on the performed interaction;

wherein data provided for the at least one field on the interface of the host application during the execution of the host application is captured based upon the position of the at least one field on the interface, and wherein the data captured from the at least one field is used to generate bar codes based upon the created association;

the generated bar codes are associated with one or more physical documents for automating input of the one or more physical documents into the document management system;

the bar codes are generated before the one or more physical documents exist;

an indexing process is performed from the executing application, wherein the indexing process assigns an index record including keyword values to corresponding physical documents from the data provided to the interface, during the indexing process, the user matches data currently displayed on the interface of the host application with a particular physical document to be indexed in the document management system to eliminate needs to re-key index information of the particular physical document in the document management system; and the index record is associated with the plurality of physical documents.

13. The system of claim 12, wherein the at least one field on the interface is identified through a unique window identifier that is assigned to controls appearing on the interface, wherein identification of the at least one field on the interface is used to determine whether the data provided to the at least one field is to be used in generating the query for retrieving the document images from the document management system.

14. The system of claim 12, wherein the identification of the at least one field one the interface is used to determine whether the data provided to the at least one field is to be used in generating the query for retrieving document images from the document management system.

15. The system of claim 12, wherein the at least one field one the interface is identified through an absolute position of the at least one field on the interface, wherein the identification of the at least one field is used to determine whether the data provided to the at least one field is to be used in generating the query for retrieving the document images from the document management system.

16. The system of claim 12, wherein the at least one field on the interface is identified based upon an order in which operating system and the applications communicate to each other, wherein the identification of the at least one field is used to determine whether the data provided to the at least one field is to be used in generating the query for retrieving the document images from the document management system.

17. The system of claim 12, wherein a retrieval-related attribute used to retrieve the document images comprises a keyword type to be searched when retrieving the document images from the document management system while the enabler and host applications are executing.

18. The system of claim 12, wherein other associations are created between other fields on the interface and retrieval-related attributes, wherein data specified in the other fields on the interface are used to create at least a query that retrieves the document images from the document management system.

19. The system of claim 12, wherein document images stored in the document management system are retrieved by performing a keyboard event on the host application's field that contains a keyword value.

* * * * *